United States Patent [19]
Monks et al.

[11] Patent Number: 6,154,731
[45] Date of Patent: Nov. 28, 2000

[54] COMPUTER ASSISTED AND/OR IMPLEMENTED PROCESS AND ARCHITECTURE FOR SIMULATING, DETERMINING AND/OR RANKING AND/OR INDEXING EFFECTIVE CORPORATE GOVERNANCE USING COMPLEXITY THEORY AND AGENCY-BASED MODELING

[76] Inventors: Robert A. G. Monks; Ric Marshall, both of 28 Monastery Rd., Cape Elizabeth, Me. 04107

[21] Appl. No.: 09/233,811

[22] Filed: Sep. 3, 1998

Related U.S. Application Data

[63] Continuation of application No. PCT/US98/15918, Jul. 31, 1998
[60] Provisional application No. 60/054,266, Aug. 1, 1997, and provisional application No. 60/054,542, Aug. 1, 1997.
[51] Int. Cl.[7] ................................................ G06F 17/60
[52] U.S. Cl. .................................... 705/35; 705/7; 705/36
[58] Field of Search ................................ 705/1, 7, 8, 10, 705/11, 35, 36, 37

[56] References Cited

U.S. PATENT DOCUMENTS

| | | | |
|---|---|---|---|
| 5,369,570 | 11/1994 | Parad ......................................... | 705/8 |
| 5,406,477 | 4/1995 | Harhen ................................. | 395/500.27 |
| 5,732,397 | 3/1998 | DeTore et al. ............................. | 705/1 |

OTHER PUBLICATIONS

"Gensym Introduces ReThink—a Software Toolkit for Modeling Business Processes and Workflow"; Business Wire; p9281091; Sep. 28, 1995; Dialog: File 148, Acc# 08157468.

DeWittle et al.; "Inside the Process"; Manufacturing Systems; v15 n3; p. 70–75; Mar. 1997; Dialog: File 15, Acc# 01496896.

"Micrografix Previews Optima! 2.5 Process Management Tool Software"; PR Newswire, p1111DATU028; Nov. 11, 1997; Dialog: Fiel 148, Acc# 09868074.

*Primary Examiner*—Emanuel Todd Voeltz
*Assistant Examiner*—George D. Morgan
*Attorney, Agent, or Firm*—Irah H. Donner; Hale and Dorr LLP

[57] ABSTRACT

A computer program product stores computer instructions therein for instructing a computer to perform a process. The program product includes a recording medium readable by the computer, and computer instructions stored thereon instructing the computer to perform the process. The instructions and the process include determining and storing at least one enterprise attribute data, customer attribute data, shareholder attribute data and government attribute data, and implementing an enterprise computer simulation model that utilizes the attribute data and generates enterprise performance data. The enterprise simulation model evaluates the enterprise performance data with respect to the at least one of each other and predetermined criteria. The data from evaluated enterprise performance is then used for ranking, indexing, decision making, enterprise controlling and/or investment purposes, manually and/or electronically.

24 Claims, 20 Drawing Sheets

Custom Parameter Settings

General
- timeLimit: 300
- seed: 1
- ☐ specificSeed

Government
- vigilenceLevel: 1
- maxVigilenceLevel: 20
- brightLine: 30
- legalExternalizationLimit: 3
- ☒ repetitiveFines

Prizm
- activationTime: 50
- criticalShareHolderMass: 3
- ☒ active

Shareholder
- reactionLevel: 1
- maxReactionLevel: 10

Corporation
- activityLevel: 1
- maxActivityLevel: 10

Customer
- brandLoyalty: 19
- maxBrandLoyalty: 20

[Apply] [Cancel]

Warning: Applet Window

FIG. 13

COMPUTER ASSISTED AND/OR IMPLEMENTED PROCESS AND ARCHITECTURE FOR SIMULATING, DETERMINING AND/OR RANKING AND/OR INDEXING EFFECTIVE CORPORATE GOVERNANCE USING COMPLEXITY THEORY AND AGENCY-BASED MODELING

RELATED APPLICATIONS

This application is a continuation application of, and claims priority to, International Application No. PCT/US98/15918, filed Jul. 31, 1998, which in turn claims priority to U.S. Provisional Application Ser. No. 60/054,266, filed Aug. 1, 1997 and U.S. Provisional Application Ser. No. 60/054,542, filed Aug. 1, 1997, all of which are hereby incorporated by reference.

BACKGROUND OF THE INVENTION

1. Field of the Invention

The present invention generally relates to a computer assisted and/or implemented process and architecture for simulating, determining and/or ranking and/or indexing effective corporate governance, and more particularly, to a computer assisted and/or implemented process and architecture for simulating, determining and/or ranking and/or indexing effective corporate governance using complexity theory and agency-based modeling.

2. Background of the Related Art

In the earliest days of free enterprise there was little distinction to be drawn between ownership and management of business entities. In most cases these roles were played by the same individuals, who brought to the economic system their own personal goals and aspirations and, in turn, their own sense of accountability. For better or worse, this direct personal involvement provided the essential driving force of our economic growth and development.

As these private enterprises grew and evolved, however, new forms of ownership emerged, beginning with the various forms of partnership and proceeding to the development of the modern corporation. In this form an immediate gap appeared, and then widened, between the functions of ownership and management. As a result, the direct human involvement of individual owners grew increasingly removed from management.

The need to bridge this gap has in turn provided the foundation for much of our contemporary system of contract law and our standards of accounting practice, all formal mechanisms devised to codify and monitor the various relationships between and within business entities.

The development of the modern publicly held corporation accelerated this process tremendously, as represented by the rise major US federal regulatory organizations ranging from the Securities and Exchange Commission (SEC) to the recently created Independent Standards Board, both powerful sources of standards for corporate life.

The key advantages of the corporate form-limited liability and a vastly expanded capacity for raising capital-have led in turn to the development of a corporate culture far removed from the greater concerns of individual owners, with a resultant focus on near-term growth and profitability. This tendency of large corporations to organize themselves around short-term interests is increasingly a matter of public concern. Despite the continued existence of other business forms, large publicly held corporations dominate the developed world's economic landscape.

The problem of 'short-termism' is far more pervasive than critics have acknowledged to date. In the usual commercial parlance this is a term managers and others use to blame shareholders for their preoccupation with quarterly-even daily-results. This preoccupation, critics say has generated a culture antithetical to good management. The implication here is that if only shareholders would let managers manage, decisions would be made for the 'long term'. Management and directors are likely to be limited to their own tenure, which is very rarely longer than 10 years. We will need a longer-term perspective, and we are more likely to find it in long-term owners.

In the absence of clear owner-driven values, the managers of many publicly held corporations have become increasingly powerful, filling boards to suit their own agendas and commanding enormous personal compensation and severance packages. These boards and managers hire corporate counsel on the basis of their ability to externalize accountability, ethically as well as economically. All too often, corporations use their powers of self-transformation to play a shell game. Instead of transforming themselves to enhance long-term value, many corporations use acquisitions, divestitures, and restructurings for lesser purposes-to control disbursement of profits to shareholders, to manipulate competition in the marketplace, or to avoid the payment of public taxes.

With their tremendous power to influence public policy and the public economy, these boards and managers have become increasingly accountable only to themselves. Instead of embracing the challenges of adaptation to and effective engagement in a dynamic, living economy, these short-term driven companies seek to bend the rest of the economic system to their own needs.

Historians may well look back on the 1990s as a time when corporations trampled the public interest in the pursuit of their own ends. Few in our time would share that view.

This brief history of the corporate form represents our best attempt to explain in plain English what can happen when ownership and management separate. In facing this problem, we have to stop looking for a familiar answer based on human experience.

Corporations are neither people with hearts nor machines with perfect logic, but rather systems with their own dynamics, driven entities that seek unlimited life, size, power, and license, eventually to the point of threatening the entire economic system with the loss of credibility-and, perhaps existence.

CORPORATE DANGER #1: THE QUEST FOR UNLIMITED LIFE

Corporations collectively may have perpetual life as a species as long as they remain harmonious with the principles of nature. Individually, however, corporations should risk mortality. Yet they avoid this risk, impelled by the fundamental law of bureaucracy, and helped by current systems for ownership, taxation, and pay.

Ownership. As it is currently conceived, ownership is forever. There is no limit under the current business system to how long an owner can reap returns from an investment. But this need not be so.

Taxation. Companies do not pay federal taxes on account of growth in value, until a taxable event occurs. The death of a corporation through liquidation can be a taxable event. Companies would rather live an unhealthy life than die and pay taxes.

Bureaucracy's 'Law'. It is in the nature of bureaucracies to get bigger. A bureaucracy (or a bureaucratic company) cannot get bigger if it dies. So it continues living at all costs.

Pay. Executive pay is based on sales and profits, and no incumbent wants to take a hit. Managers would rather save the bad news for the next guy or gal. Lucky for them, many significant costs-for example, the cost of decommissioning a nuclear power plant-can be deferred indefinitely. By not reporting these future costs, and by externalizing other costs, the corporation can live forever, and always put off into the sunset the payment of expenses.

This last point is worthy of special attention, because it has caused a change in the theory of executive pay. Once upon a time, only owners reaped huge rewards from the growth of a company. Now it is any current manager!

CORPORATE DANGER #2: THE QUEST FOR UNLIMITED SIZE

Growth is not always pretty. It can come from positive feedback—a kind of geometric pattern that can 'lock in' inferior technologies. The result is growth of a product (and its makers) that comes not from merit but from a chain reaction. A common example of lock-in is VHS versus Beta for videos. The latter was better but came too late to succeed.

Just as organisms within a lineage tend to increase in size so corporations tend to increase in size. Like long corporate life, big corporate size can evolve irrespective of merit. As a corporation increases in size, it also increases in complexity. To increase in size requires funding, which comes from profits. How does a corporation's quest for profits affect its behavior?

The corporation's search for profits is 'relentless'. A company is held to account in the marketplace. One of the principal elements of a company's marketplace appraisal is its performance as recorded by certified public accountants. Bolstered by the professional education and prestige of accountants, the efforts of the SEC and of self-regulatory standard-setting organizations such as the Financial Accounting Standards Board and the New York Stock Exchange, 'the numbers'-constrained by generally accepted accounting principles (GAAP)-provide a preponderantly honest and consistent picture which is susceptible of sophisticated interpretation.

But no one should be under any illusions that GAAP numbers provide a reliable basis for determining the value of a company. They are what they say they are-no more, no less-a statement of financial condition based on principles consistently applied. This is the essence of the corporation's mechanistic nature: something we must live with but something that we cannot assume has human interests at heart.

For example, in recent years, the integrity of GAAP numbers has squarely been strained by the continuing proliferation of 'restructuring' charges. The pattern of taking a special charge to account for unusual and nonrecurring circumstances is doubtless a useful convention. The pattern of taking charges every year in amounts that often dwarf the reported 'earnings' is to make a mockery of the whole process.

With the dramatic changes in corporate condition reflected by massive charge-offs, anomalies emerge that illumine the limitations of the process. For example, Westinghouse, one of the Dow Jones 30 companies in America with a seemingly sustainable capacity to generate a billion dollars a year of cash flow, has only a nominal net worth according to GAAP. 'From 1991 to 1995, 26 of the companies that constitute the Dow Jones Industrials took 69 restructuring actions, including asset write-downs. In the process, they charged away more than $49 billion of stockholders' equity.'

A further problem with GAAP is that it places emphasis on traditional assets that have increasingly little to do with the generation of income in a world dominated by new invention and informed by the communications revolution.

An important corollary to the corporation's search for unlimited size is the aforementioned notion of externalities. In using the term 'externalizing' here, we were referring to the externalization of costs-making others (taxpayers, customers, and so forth) pay for costs that should rightly be assumed by the corporation. The notion of externalities has received renewed attention.

Corporations are driven by the imperative of short-term value maximization. They want to have an immediate profit, and they do not care (remember, they are not human) if this profit is achieved at the expense of others, including future generations.

Corporations have wide and long-term social impact that extends well beyond those items that are generally included within GAAP. These externalities range from the costs of training, medical and disability expenses arising from work, unemployment, and impact on the environment.

CORPORATE DANGER #3: THE QUEST FOR UNLIMITED POWER

The rules under which corporations are chartered are created by the political government of their domicile. The 'externalizing machine' inevitably inclines to attempt to dominate the sovereign. The most dramatic example of attempted dominion is the ability of the corporate community over the decades to dominate the quality of the legal professions and, thus, over time the interpretation of the law.

The extent of corporate involvement in elections has increased dramatically. One new pattern has evolved. To the consternation of Republicans, big business his persisted in contributing substantial amounts to both political parties. Republican congressional leaders threaten reprisals on those who support the enemy. A stronger imperative is involved for business. The political parties are, in effect, subsidiaries of big business. What is important is that the whole process become dependent on business' financial support. This, rather than the success of either political party, is the essence of corporate strategy.

The nature of political fund raising has changed the face of federal elections. We have been accustomed for a century or more to the spectacle of one special interest group or another 'buying' access and influence. But that strategy now seems too modest. The Business Round table provides a new level of sophistication in political power and communication that business lacked in past times. It hedges its bets! Now large corporations give money to both political parties. What is at stake is not partisan favor, but domination of the entire political process by the business sector. Business money has become virtually intrinsic to the political process.

From power over elections flows power over lawmaking, another key threat within the danger of corporate power-seeking. Perhaps nowhere does the raw power of corporate energy reveal itself more obviously than in this infamous industry-ongoing in every capital city in every major country in the world, bar none. In Washington, D.C., the lobbying economy exceeds the government itself, and is growing geometrically. In the first half of 1996 alone, lobbyists spent $400 million to influence government.

The very existence of a huge lobbying industry in a free market economy bears testimony of its effectiveness: given such a huge investment in manpower, there must be some return from it. Those who seek such proof need go no further than corporate welfare.

Another mode of power sought by corporations is power over government resources—a form of entitlement otherwise known as corporate welfare. Wealth redistribution by government is increasingly important in contemporary society. It takes many forms: government franchises, contracts, subsidies, and the use of public resources. Corporations have effectively organized themselves to share in the 'government created' wealth.

In summary, more PACs means more lobbyists means more corporate welfare and further skewing away from the public interest in the allocation of public resources. This vicious circle is self-reinforcing. Because representatives in the United States and other countries receive funds from industries represented by the lobbyists, there is virtually no political libido for taking on corporate welfare, notwithstanding that it has been identified and publicized by all shades of political sentiment.

Corporations also include power over 'independent' agencies and professions. Corporations are able to pay the highest prices for goods and services. The most prestigious professions depend on securing their share of corporate business in order to prosper. This leverage has been compounded in recent times by increasing percentages of the 'best talent' entering business related professions.

The movement away from the professions and toward businesses is driven in part by the simple fact that businesses yield more power than the professions. Proof of this fact can be seen in the stunning defeat of a sensible proposal for stock option accounting in the United States.

There has been great concern lately over the extraordinary increase in the level of compensation for the top executives of US corporations. The current levels of pay would have been unimaginable in earlier times in the United States-and they are utterly out of sync with the pay levels abroad today. Management pays itself without effective overview by anyone. In recent times, management has even managed to dominate the national accounting system with respect to a key aspect of its compensation: stock options.

Corporations also possess power over the judicial process. The sheer talent available to business has had vast impact in its relationship with government. Consider those situations where the stakes are high enough to warrant litigation. The antitrust suit that the United States government began in the waning minutes of the Johnson Administration and waged against International Business Machine Company for almost 20 years until the presidency of Ronald Reagan demonstrated the capacity of a private company with unlimited resources to create a legal competency that ultimately triumphed over the government.

CORPORATE DANGER #4: THE QUEST FOR UNLIMITED LICENSE

Just as the corporation externalizes costs in its quest for unlimited power, so it externalizes accountability in its quest for unlimited license. We take comfort in the existence of corporate criminal laws, but this very term is a misnomer. If a corporation commits a crime, how can it be punished beyond the payment of a fee?

Instead, corporations have treasuries to be fined. Thus from the perspective of the corporation, the decision whether to obey the law is one of many that involve a cost/benefit calculation. Will the costs of disobedience discounted by the probability of being discovered, prosecuted, and fined equal the costs of compliance?

Because we see corporations as people or machines, and not for what they are, we tend to minimize the effects of corporate crime. If we think of corporations as people, we might think they will somehow feel guilty. And if we think of them as machines, we might think they will break down, as crime does not pay. We fall to recognize that corporations do not respond to incentives and penalties applicable to human beings.

One of the competitive attractions of conducting business through corporate form is that liability for the venture's costs is limited to the amount of the investment. This 'limited liability' notion appears to excuse shareholders from further responsibility respecting corporate property.

Plainly, corporations must exist in a civil society where the rules are made by governments. A decent relationship with government is essential for the operation of business. The corporation itself will need to exercise restraint in this regard, refraining from undue interference in lawmaking. Such restraint can help restore accountability to the corporation.

SUMMARY OF CORPORATE CHARACTERISTICS

Corporations that attempt to lock in immortality through mortmain techniques for perpetual life may succeed for a time. In the long run, however, like the mechanical bird, they come to an ungracious end. Because corporate change has been gradual and its consequences largely unanticipated and unintended, no one seems to have noticed the absence of owner accountability. Missing also is a measurement of the toll exacted by enjoyment of property without responsibility.

We have determined that the problems of the modern corporation will not solve themselves through an efficient market, a bell curve, or a matrix. We must expand our language, and hence our vision.

As discussed above, the above corporate governance programs are generally insufficient to adequately gauge long term corporate performance. For example, we have determined that one significant cost/consideration that is generally not covered by standard corporate governance programs is the long term cost for corporate compliance when violating rules or laws. The cost of compliance may be so significant that a corporation may be unable to overcome these problems.

RELATED INVESTMENT PROGRAMS

On other fronts, various attempts have been made to maximize investment returns from an individual perspective. For example, U.S. Pat. No. 5,193,056 to Boes, incorporated herein by reference, relates to a data processing system and method for use in managing a partnership portfolio and partner fund (Hub and Spoke) financial services configuration. Such a data processing system is used once the Hub and Spoke configuration has been established, in which the assets of two or more funds are invested in a portfolio. FIG. 1 depicts an example of a Hub and Spoke configuration involving four different mutual funds. A portfolio (Hub) 2, which is set up as a partnership as described above, has as its partners and only investors funds (Spokes) 4, 6, 8, and 10. In the example shown, fund 4 is a load fund, fund 6 is a low-load fund, fund 8 is a no-load fund, and fund 10 is a common trust fund. Each of funds 4, 6, 8, and 10 have shareholders 5, 7, 9, and 11, respectively, with fund 10 having trusts as its shareholders 11.

FIG. 2 presents an overview of the information flow that occurs in the management of a Hub and Spoke financial services configuration. A shareholder 40 requests purchases or redemptions of shares in a fund from a transfer agent 42. Transfer agent 42 is responsible for tracking the shareholder activity for each fund, which is accomplished with the aid of a personal computer 44 capable of producing printed output 46. Information on shareholder purchases and redemptions for each fund is passed to a portfolio/fund accountant 48.

Portfolio/fund accountant 48 is responsible for the portion of managing the Hub and Spoke configuration that involves allocation of portfolio assets among each of its funds, taking into account market value fluctuations in the portfolio's investments of its assets as well as shareholder purchases and redemptions in each fund. The portfolio/fund accountant makes use of a personal computer 44 programmed with software 50. One example of software 50 is the "HandS" (a service mark of Signature Financial Group, Inc.) computer program. The personal computer 44 used by portfolio/fund accountant 48 is capable of producing printed output 46 and storing data on data disk 52, which preferably is a floppy disk.

Portfolio/fund accountant 48 receives information from and provides information to a general ledger 54 and a portfolio accounting system 56, both of which are computer programs of a type commonly used in accounting and which may be combined in a single software application. An integrated software package may combine software 50 with either or both of general ledger 54 and portfolio accounting system 56. Information from printed output 46 may be entered into general ledger 54 and portfolio accounting system 56 and then passed along to transfer agent 42. Portfolio/fund accountant 48 also provides information to and receives information from an investment advisor 58, who is responsible for investment decisions regarding the portfolio's assets.

Information on data disk 52 is transferred to a portfolio administrator 60. The Hub and Spoke management responsibilities of portfolio administrator 60 include issuing and maintaining software 50, periodically reviewing for errors in data submitted by portfolio/fund accountant 48, and calculating and processing data to obtain the year-end data for the portfolio and funds for tax and accounting purposes. Portfolio administrator 60 uses personal computer 44 running software 50 and capable of producing printed output 46. Typically, portfolio administrator 60 manages several separate Hub and Spoke configurations.

U.S. Pat. No. 4,722,055 to Roberts, incorporated herein by reference, relates to methods and apparatus for funding a future liability by means of an insurance investment program. The system estimates the expected cost of the liability when the liability is expected to occur and computes the present value of each unit of insurance needed to yield that expected cost at maturity. The system also aids the insurance fund manager in making decisions regarding investment of fund assets in order to meet present and future obligations of the fund.

FIG. 3 is a flowchart of the computer process for funding a future liability in the Roberts patent. In FIG. 3, the customer transaction operations performed at the point-of-sale stations include blocks 11–14. Customer transactions can be purchases, payouts, or redemptions of fund units. Unit purchase data is entered at block 11, unit payout data is entered at block 12, and unit redemption data is entered at block 13. Each entry includes the customer's name and account number and the transaction amount. The entered transaction data is stored at block 14 for transmission to the central processing facility.

The transaction data accumulated at the point-of-sale stations is transmitted periodically (e.g., daily) to the central processing facility. The data for each incoming transaction is processed individually in a loop beginning with block 15 and ending at block 25 where all transactions in a batch (e.g., a day) are totalled prior to further processing as a group in accordance with block 26 et seq. The incoming transaction data is first subjected to test 15 which determines whether the transaction is a purchase (NO output) or a redemption (YES output).

If the transaction is a purchase, the system flow passes to test 21 which determines if the purchase is the first transaction in a new account or an additional transaction in an existing account. For new accounts the system flow passes to block 22 which creates a new entry in the account list based on the transaction data. Transaction data for both new and existing accounts then passes to block 23 which checks the transaction data for possible errors in calculation at the point-of-sale station.

If the transaction is a payout or a withdrawal, data flow moves from test 15 to block 16 where the transaction data is verified to confirm that it is from a valid account. The account information necessary to verify the transaction data is supplied from the account list stored in the system's master file, shown at block 17. Thereafter, the data flow passes to test 18, which determines whether the transaction is a payout (withdrawal at maturity) or a redemption (withdrawal before maturity). Payout transaction data passes to verification block 23. For redemption transactions, the redemption before maturity penalty (RBMP) must be calculated. This is accomplished at block 19.

The RBMP calculation is based on the current value of an insurance unit which is a function of the present college cost data. The college cost data is supplied from one of the system's data files shown at block 20. From the RBMP calculation, system flow for redemption transactions also passes to verification block 23 which checks for possible errors made at the point-of-sale station.

From verification block 23, system flow passes to block 24, where each transaction is recorded in the system's master file, and the customer account list data is updated. Thereafter, system flow passes to block 25, where purchase, payout, and redemption transactions are totalled. Next, system flow passes to block 26, where the current spread calculation is carried out to create an updated schedule of the current charge to customers for insurance units based on the prevailing college cost and inflation rate data. The updated schedule of current charges is transmitted to the point-of-sale stations. There, the schedule is used by the salesmen to provide cost information to customers and to set the cost for unit purchases, unit payouts, and unit redemptions.

System flow then proceeds to block 27 which carries out the update asset position operation to determine what investment transactions should be made in the fund investment portfolio based on current and projected customer transactions. The data processing system advises the fund manager of its determination concerning the net amount of required investment transactions and provides a list of the investments which might be suitable for purchase or sale. Based on this information, the manager can choose the investment transactions to be made and enter the investment transaction data into the system.

After the investment transaction data is entered, system flow passes to block 28, where a report is created for the investment manager which details the changes made during the period, including the transaction totals for the period, the fund assets purchased and sold, the projection of the cash flow requirements for customer transactions, the projection of the cash flow generated from the fund assets, etc. Next, system flow passes to block 29, where the system periodically (e.g., annually) prepares a tax liability statement for each customer and for the fund manager. Also, at block 30, the system prepares another periodic report (e.g., quarterly) to provide the customer with current account information.

Another prior method, U.S. Pat. No. 4,752,877 to Roberts et al., incorporated herein by reference, is an insurance investment plan that is implemented using a floating rate zero coupon note for funding a future liability. FIGS. 4–6 are flowcharts illustrating the computer process for funding a future liability using a floating rate zero coupon note. In FIGS. 4–6, at the beginning of each period certain variables used in the data processing system must be initialized (block 101). These variables include: the number of transactions during the day (TDAY), the number of transactions during the period (TPERIOD), the number of contracts sold during the day (DSALES), the number sold during the period (PSALES), the number redeemed during the day (DRDMP), the number redeemed during the period (PRDMP), the number of floating rate zero coupon notes of each maturity M (FRZCN(M)), and the number of each maturity sold during the day (DSFRZCN(M)), sold during the period (PSFRZCN(M)), redeemed during the day (DRFRZCN (M)), and redeemed during the period (PRFRZCN(M)).

Customers interact with the system at point-of-sale stations. These can be located at remote points limited only by the ability to communicate electronically with the central computer. Orders and customer inquiries are collected at the point-of-sale stations (block 102). The customer first enters his name (NAME) and account number (NUMBER), or if he does not have an account, indicates that a new account is to be opened. The customer then enters an order or inquiry (referred to generically at block 102 as DATA). A customer may submit a purchase order (block 103) or a redemption order (block 104) or may simply inquire as to the status of his or her account (block 105). Transaction requests include an identification of the floating rate zero coupon note to be purchased or redeemed and the transaction amount (referred to generically at blocks 103 and 104 as CONTRACT). Inquiries specify the particular information items requested. These orders are transmitted to the central computer, and information regarding transactions, floating rate zero coupon note prices, and account status are received back from the central computer and displayed on a CRT terminal (block 106). Alternatively, purchase orders and redemption orders could be stored at block 106 and transmitted periodically (e.g., daily) to the central computer for processing. At the conclusion of each transaction, a customer can request a printed confirmation record of the transaction (block 107).

Each customer request is processed individually in a loop beginning with test 108 and ending at block 125. The incoming request is first subjected to test 108. If the dollar amount of the transaction (AMOUNT) is equal to zero, the request is an inquiry, which is referred to blocks 109–111 for processing. The status of the account is checked at block 109. Information the customer requested is retrieved from the master account file at block 110 and the response is transmitted to the investor in block 111. The requested information is displayed on the CRT terminal.

If AMOUNT is not equal to 0, the customer request passes to test 112. If AMOUNT is less than 0, the request is a redemption request, and the system flow passes to block 113. At block 113 the account information is verified by checking the master account file at block 114 to make sure that the account is valid and that it contains the floating rate zero coupon notes the customer wishes to sell. When the account information has been verified, data flow moves to test 115 where it is determined whether or not the customer is requesting early withdrawal-i.e., redemption prior to the scheduled maturity date of the floating rate zero coupon note. If so, the early withdrawal penalties are first calculated at block 116. Otherwise control passes directly to block 117 where the redemption value for each of the floating rate zero coupon notes the account holder wishes to redeem is calculated.

The calculation of the redemption value for a floating rate zero coupon note is based on the periodic escalation rates in the cost of the service or commodity giving rise to the liability being funded-e.g., college tuition-over the life of the floating rate zero coupon note and involves a downward adjustment for any early withdrawal penalties. The current value of the floating rate zero coupon note is calculated by escalating the base value of the floating rate zero coupon note at the date of purchase at the rates of escalation in the cost of college between the date of purchase and the date of redemption and adding the unamortized premium or subtracting the unaccredited discount, as appropriate. These escalation rates are taken from the master file of escalation rates in U.S. college costs at block 118. After the redemption value has been calculated, the amount of cash that will have to be paid to the account holder is subtracted from the amount of cash in the system at block 119. Control then passes to block 123.

If instead AMOUNT is greater than 0, the request is either a purchase request or an installment payment relating to an earlier purchase. In that case, control passes from test 112 to test 120, which determines whether the request pertains to a new account. If so, a new account is opened at block 121. Otherwise control passes to block 122 where the amount of the cash payment is added to the amount of cash in the system.

Transaction data for both redemptions and purchases then pass to block 123 which checks the transaction data for possible errors in calculation at the point-of-sale station. From verification block 123, system flow passes to block 124 where each transaction is recorded in the system's master account file and master transaction file. Thereafter, system flow passes to block 125, where the floating rate zero coupon note liability schedule is updated to reflect purchases or redemptions.

Next, system flow passes to test 126, which determines whether all the transactions for the particular day in question have been processed. If not, system flow passes back to the beginning of the loop to receive the next customer request. If it is the end of the day and all transactions for the day have been processed, control passes to block 127, which prepares the next day's schedule of floating rate zero coupon note prices.

System flow then proceeds to block 128, which carries out the update asset portfolio operation to determine the updated investment portfolio based on current and projected customer transactions, the aggregate maturity schedule for the floating rate zero coupon notes, the amount of cash available for investment, projected interest rates, the current composition of the asset portfolio, and the portfolio investment criteria supplied by the fund manager.

After the investment transaction data are entered, system flow passes to block 129 where a daily transaction report is prepared for the investment manager. This report summarizes the transactions that took place during the day; provides the end-of-day asset and liability position; furnishes the portfolio yield, investment yield, and composite cost of the floating rate zero coupon note liabilities, all on a semi-annual-equivalent-yield basis; and indicates the projected income flows from the updated asset portfolio and the projected stream of floating rate zero coupon note liabilities. Then at block 130 the variables that measure each day's activity are reinitialized for the beginning of the next day.

Next system flow passes to test 131 where it is determined whether the day in question is the last day of the current period. If not, system flow passes to block 138. If it is the last day of the period, system flow passes to block 132 where the end-of-period investment performance report is prepared. This report provides various measures of investment performance which the fund manager can use to monitor the profitability of the investment program adopted during the period. In addition, it is calculated in block 132 whether the fund is overfunded or underfunded and the amount of any overfunding or underfunding. A significant underfunding would signal to the fund manager the need to find higher yielding investments in the asset portfolio in order to avoid the danger of failing at some point to have sufficient cash to meet maturing floating rate zero coupon note liabilities.

Next system flow passes to block 133 where the system periodically (e.g., quarterly) calculates for each account holder the amount of investment income and the amount of taxable income earned during the period on the floating rate zero coupon notes in his or her account. At block 134 the system prepares end-of-period reports for mailing to account holders. System flow then passes to block 135 where the end-of-period financial statements are prepared drawing on information that has been recorded in the accounting files at block 136 during the period. System flow then moves to block 137 where the variables that measure each period's activity are reinitialized for the beginning of the next period.

Next system flow passes to block 138 where at the end of each day the daily transaction summary and summary of current position are transmitted to the fund manager and at the end of each period the investment performance and position report and the end-of-period financial statements are transmitted to the fund manager.

Thus, the above patents are related to a specific procedure for estimating the expected cost of the liability when the liability is expected to occur, and computing the present value of each unit of insurance needed to yield that expected cost at maturity. However, these patents do not solve the problem of administering and/or managing a program that attempts to optimize or maximize resources with respect to effective corporate governance.

In addition, these patents do not solve the problem of implementing a program designed specifically for simulating and/or managing and/or administering a corporate governance program. Further, these patents do not solve the problem of determining and/or measuring and/or controlling coporate governance, thereby compromising and/or jeopardizing the appropriate administration of corporate governance.

These patents also do not solve the problem of tracking the performance of corporate performance, while also managing reports on the performance, for example, in a distributed data base environment. Further, these patents also do not solve the problem of tracking the performance of corporate resources, while also managing reports on the performance of the resources, in a distributed computing environment, such as over the internet and/or intranet and/or private networks.

We have determined that corporations are complex adaptive systems. We have also determined that it is desirable to provide the capability to explore how the involved owner can help 'restore' the corporation to a more living paradigm by reconciling the corporation's two natures-its superimposed mechanistic nature, born of its own instinct for self-perpetuation, and its underlying dynamic nature, born of an innate responsiveness to human needs.

We have further determined that it is desirable to model, in particular the mechanisms, whereby corporations externalize costs in an effort to maximize short-term market gains and profitability, and how the countering influence of active shareholders might impact these behaviors.

SUMMARY OF THE INVENTION

It is a feature and advantage of the present invention to administer and/or manage a program that simulates, determines and/or ranks effective corporate governance.

It is another feature and advantage of the present invention to administer and/or manage a program that simulates, determines and/or ranks effective corporate governance using complexity theory and agency-based modeling.

It is another feature and advantage of the present invention in providing the software tools and/or capability to explore how the involved owner can help 'restore' the corporation to a more living paradigm.

It is another feature and advantage of the present invention in providing the capability to model, in particular the mechanisms, whereby corporations externalize costs in an effort to maximize short-term market gains and profitability, and how the countering influence of active shareholders might impact these behaviors.

It is another feature and advantage of the present invention to administer and/or manage a program that simulates, determines and/or ranks effective corporate governance, in a distributed computing environment, such as over the internet and/or intranet and/or private networks.

The present invention is based, in part, on our discovery that an administration system and/or monitoring system and/or ranking and/or indexing system may be constructed or produced that effectively manages, administers and/or generates reports for administering and/or managing a program that simulates, determines and/or ranks and/or indexes effective corporate governance. We have further discovered that an administration system may be produced that effectively manages or administers a program that simulates, determines and/or ranks and/or indexes effective corporate governance to maximize same.

The modern corporation is poised for change through increased activism from shareholders. Humankind and all its creations struggle to reconcile the predictable and the dynamic. This is the moral of the timeless story of 'The Nightingale' by Hans Christian Andersen. It is also the nature of the corporation, a human creation of special importance.

Seven panaceas prevent us from finding the solution to the problems inherent in the modern corporation: the CEO 'philosopher-king', corporate chartering, independent directors, well-structured boards, independent experts, the free press, and multiple external constraints. Taken separately, each of these can lull us into dangerous complacency. Taken together—along with the actions of independent, informed, motivated, and empowered shareholders—these elements are transformed from panaceas to solutions.

Like all complex adaptive systems, corporations have both regularities (predictable, mechanistic laws) and dynamics (forces for change). Corporate regularities, which are shared by other manmade institutions, are the drives for unlimited life, size, power, and license. Corporate dynamics, which are shared by all CASs, are multiplicity, spontaneity, accommodation, adaptation, transcendence, and metamorphosis. These dynamics can counterbalance the four corporate dangers of unlimited life, size, power, and license—bringing instead long-term life, appropriate size, balanced power, and greater accountability to long-term owners.

Agent-based computer modeling can advance our inquiry. Our 'Brightline' model, described below, represents, among other factors, the dynamics of externalization in interactions among four key agents in the large publicly held corporations: customers, corporations, government, and shareholders. Companies compete for customers by reducing their liabilities through externalization. An aggressive management that is compelled by its shareholders to function within government-determined limits on externalization will generate superior values over the long term.

Brightline is based on complexity theory and agent-based modeling, which can be used to study and predict the impact of good corporate governance on the sustainable value of publicly held corporations. The basic Brightline algorithm, implemented initially around but one of the essential elements of effective corporate governance, is extendable to model the full range of governance activities. By "corporate governance" we mean the various practices whereby the shareholders of a public corporate exert their various rights over management in insuring maximum sustainable value.

At the heart of effective corporate governance is the presence of "active and informed shareholders". We believe that active and informed shareholders will seek three consistent behaviors from corporations: 1) that they obey the law; 2) that they make full disclosure of the impact of their activities; and, 3) that they exercise restraint in their dealings with the government. From an active shareholder's perspective, the ideal corporation would be fully internalized, or fully disclosing, or even better "transparent" in it's accounting for the real costs of doing business. Only the fully transparent corporation will truly maximize shareholder value over the long term. Where existing corporations externalize costs and further seek to influence the regulating mechanisms of government (via taxation and the imposition of penalties for illegal activities), the sustainable corporation will be required by its shareholders to accept full accountability for all of the costs of doing business.

We have chosen in our simulation model the mechanisms whereby corporations externalize costs in an effort to maximize short-term market gains and profitability, and how the countering influence of active shareholders might impact these behaviors. This provides us with an easily understood example of our basic original algorithm, which is extended, as explained below.

In accordance with one embodiment of the invention, the fully transparent corporation truly maximizes shareholder value over the long term. Where existing corporations externalize costs and further seek to influence the regulating mechanisms of government (via taxation and the imposition of penalties for illegal activities), the sustainable corporation will be required by its shareholders to accept full accountability for all of the costs of doing business.

At the beginning of each simulation run, a number of attribute variables may optionally be set by the runtime user, or a number of preset defaults may be selected. A normal run continues, for example, over 300 cycles of activity.

In the course of each cycle the Corporation agents post prices for their "products" using greater or lesser degrees of externalization of costs. While more externalization may yield a more attractive lower price, it also increases the Corporation's exposure to Government penalization, while less externalization will lead to increased shareholder dissatisfaction and, in the case of the predetermined Focus Corporation, and increased likelihood for active shareholder intervention.

Following the posting of new prices the Customer agents react by either staying where they are or moving to a different Corporation. Next the Government agent examines the cumulative externalizing practices of all the Corporation agents and reacts accordingly. Once a cumulative threshold of total externalization by all the Corporations has been reached, the Government agent will begin to react to excessive externalization by any one Corporation by levying penalties against that Corporation, further inhibiting its ability to lower prices and thereafter compete more effectively.

Finally the Shareholder agents react to this latest round of corporate "performance". Continued underperformance will eventually motivate the Focus Corporation Shareholder agents to become ACTIVE and thereafter seek to limit further externalization by their Corporation.

This cycle then repeats, until the end of the run is reached. Throughout the run the user can monitor the various elements of agent interaction through graphic representation and pop-up information windows. Of course, the above sequence of events is not required to occur in the specific series described above, but may also occur in a different order and/or in parallel.

In accordance with the computer administered and/or assisted program, a computer program product stores computer instructions therein for instructing a computer to perform a process. The program product includes a recording medium readable by the computer, and computer instructions stored thereon instructing the computer to perform the process. The instructions and the process include determining and storing at least one enterprise attribute data, customer attribute data, shareholder attribute data and government attribute data, and implementing an enterprise computer simulation model that utilizes the attribute data and generates enterprise performance data. The enterprise simulation model evaluates the enterprise performance data with respect to the at least one of each other and predetermined criteria. The data from evaluated enterprise performance is then used for ranking, indexing, decision making, enterprise controlling and/or investment purposes, manually and/or electronically.

A computer system and process is also provided. There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIG. 13 is an illustration of the parameters menu with various custom attribute settings;

The same reference numerals refer to the same parts through the various figures.

Notations and Nomenclature

Figure 1:
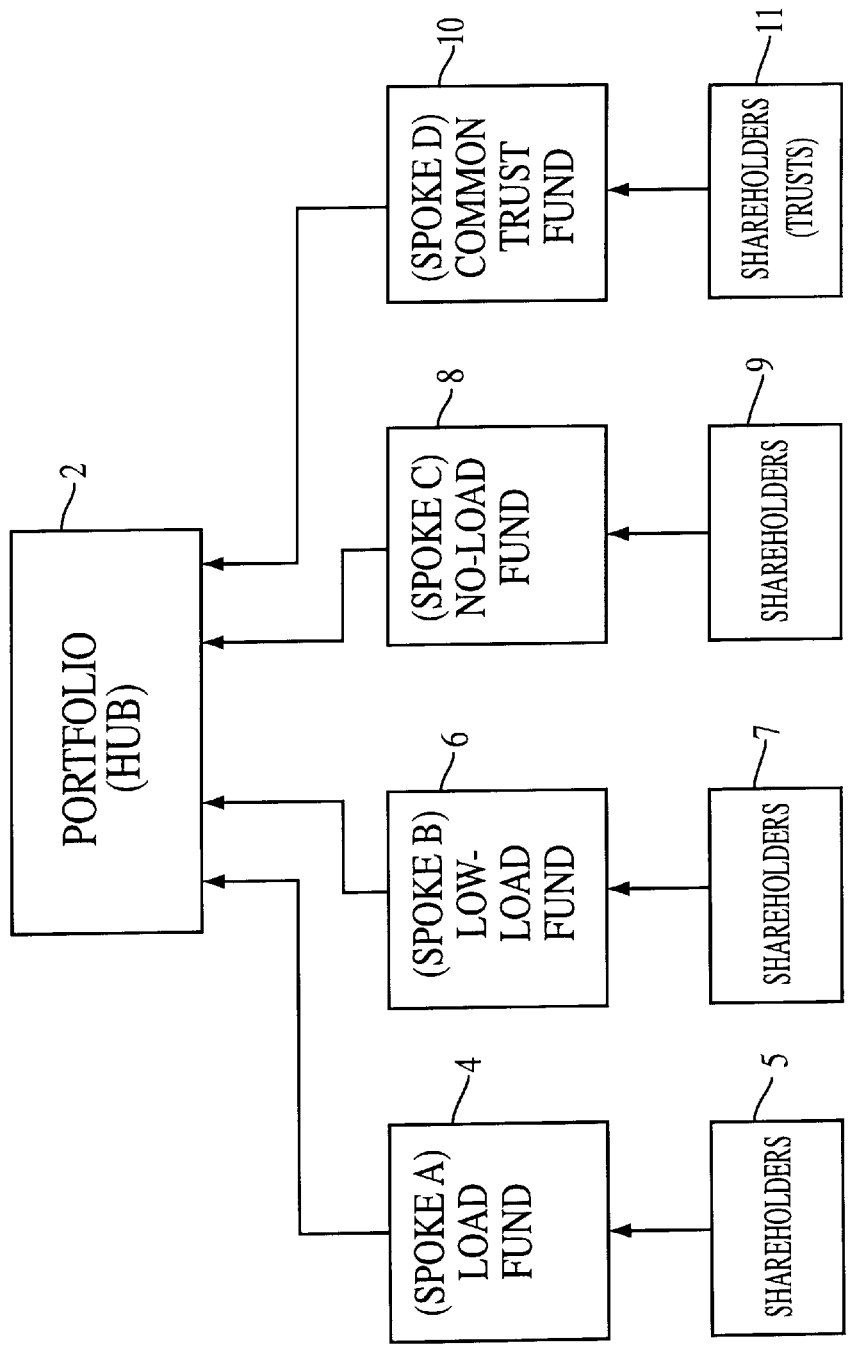
FIG. 1 depicts an example of a Hub and Spoke configuration involving four different mutual funds.
Figure 2:
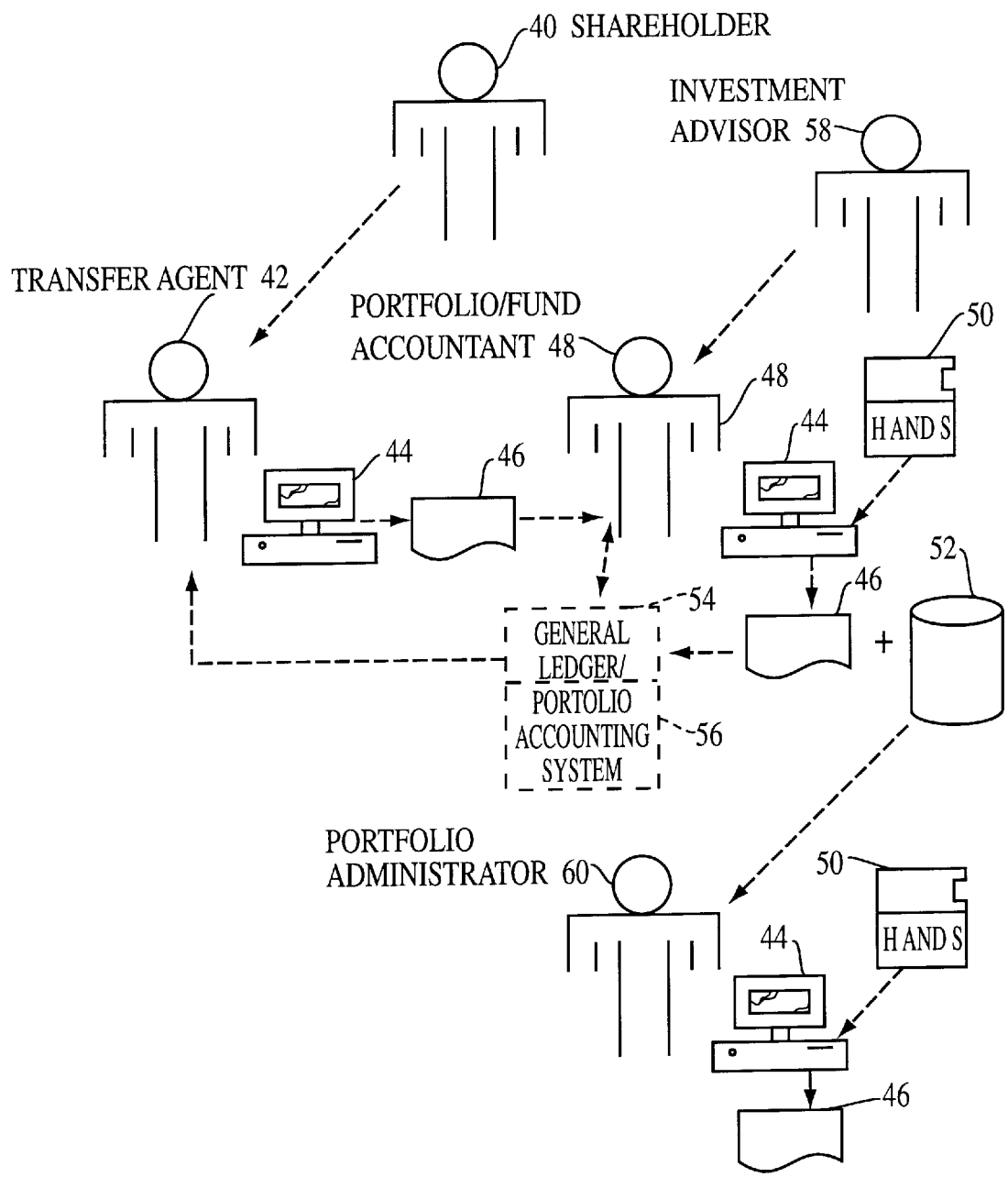
FIG. 2 presents an overview of the information flow that occurs in the management of a Hub and Spoke financial services configuration.
Figure 3:
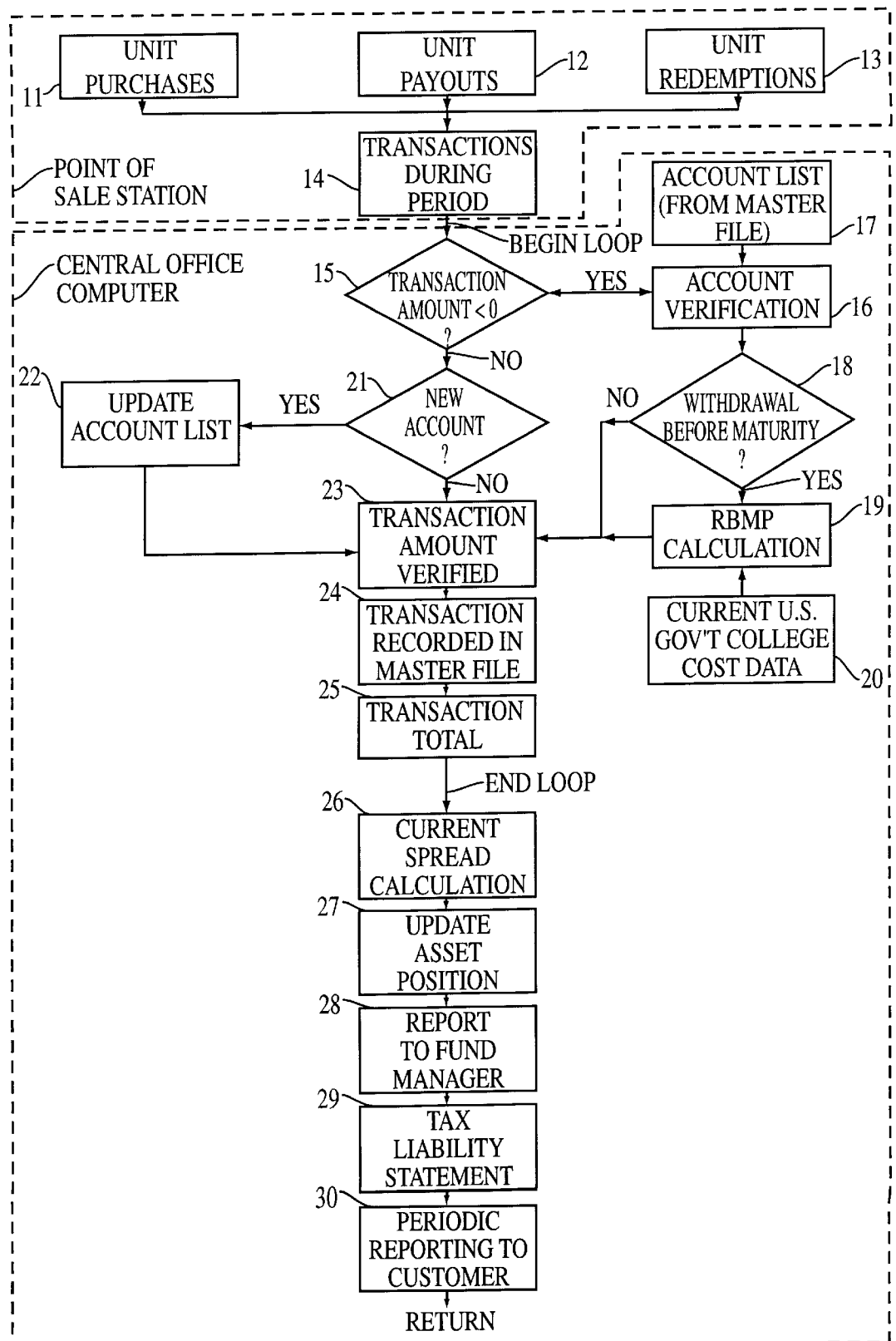
FIG. 3 is a flowchart of a prior art computer process for funding a future liability.
Figure 4:
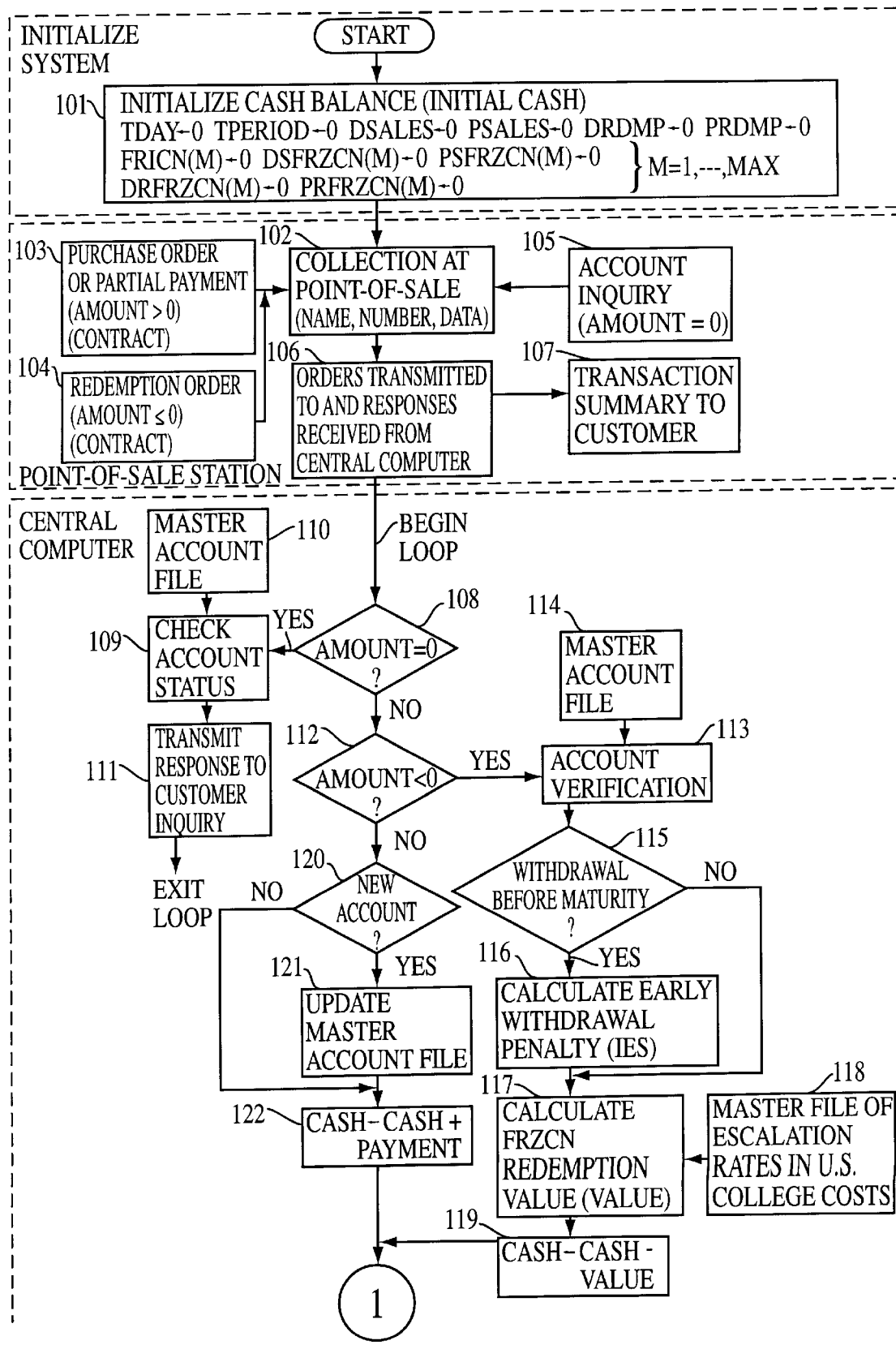
FIGS. 4–6 are flowcharts illustrating the computer process for funding a future liability using a floating rate zero coupon note.
Figure 5:
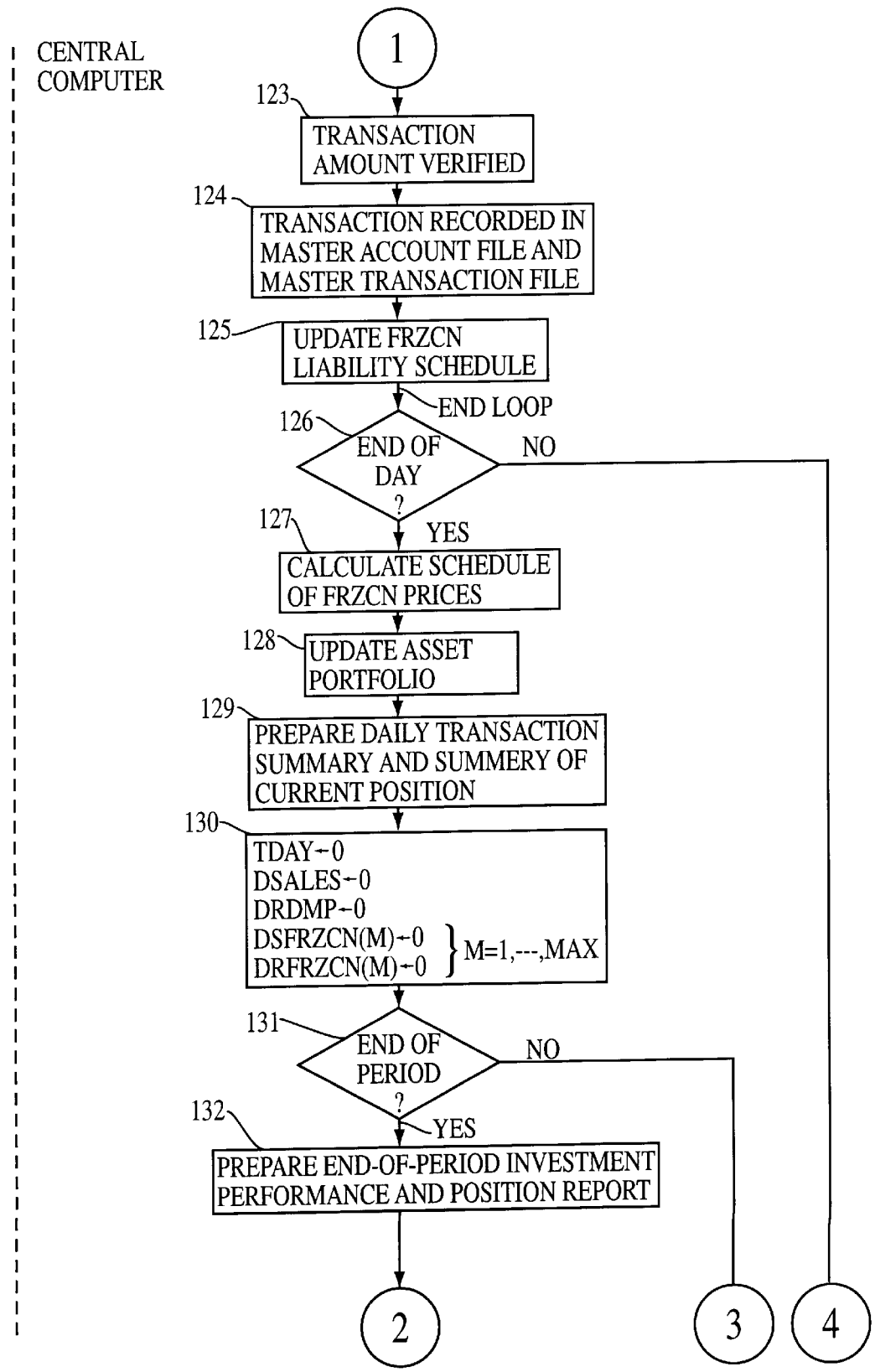
Figure 6:
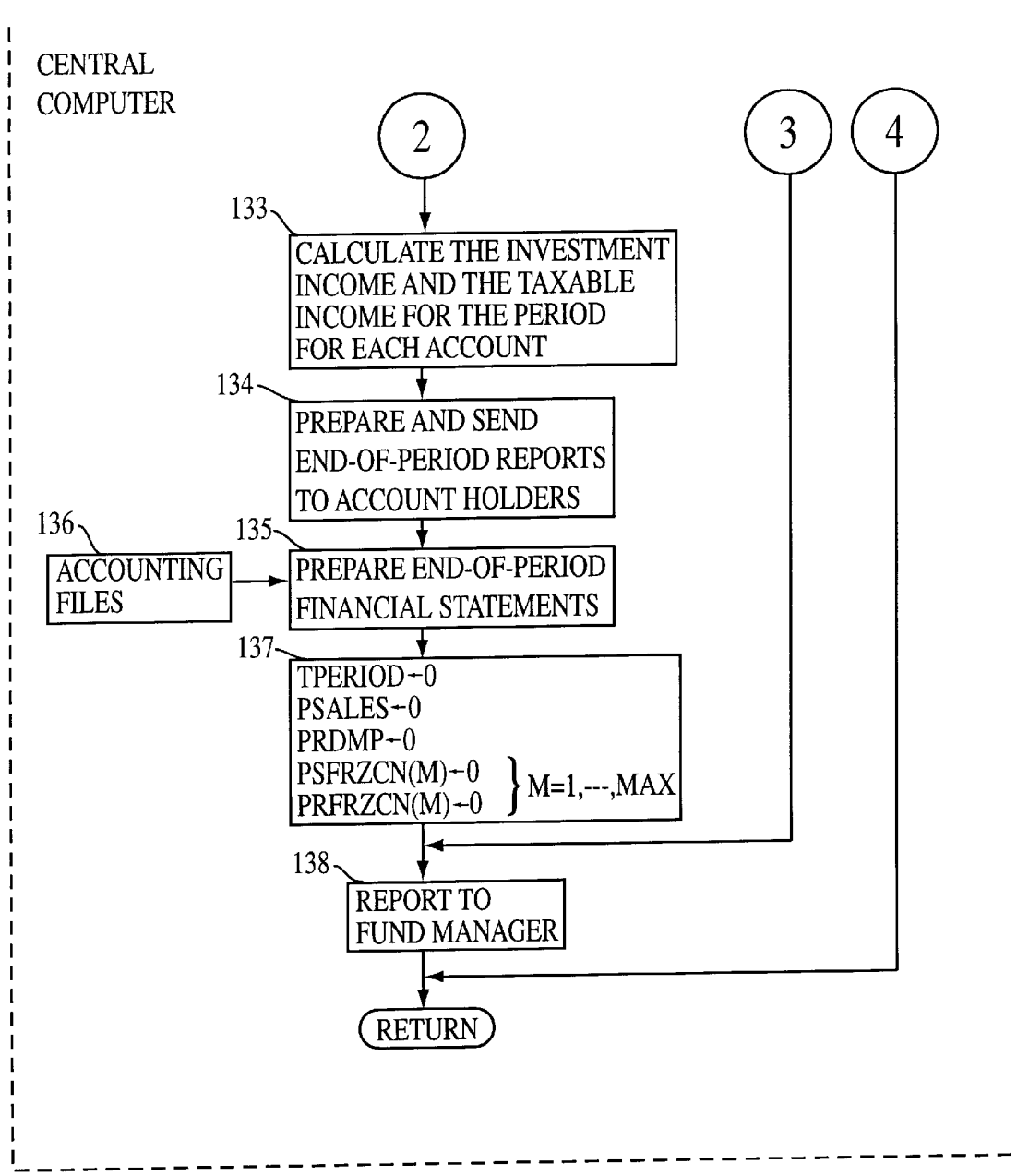

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF BEST MODE FOR CARRYING OUT THE INVENTION

The computer assisted and/or implemented process and architecture of the present invention administers and/or manages a program that monitors and/or ranks and/or indexes and/or manages and/or administers and/or simulates effective corporate governance. The goal of the program is to maximize the investment and investment performance, and to minimize obligations (e.g., taxes) associated there-with for long-term performance. The program is designed specifically for managing and/or administering resources while maintaining the appropriate focus of corporate governance and/or performance over a long-term period. The program also ensures that the retirement and/or investment resources are not prematurely diverted.

The computer assisted and/or implemented process and architecture tracks the performance of the corporation or entity, while also managing reports on the performance of the investment resources, for example, in a distributed data base environment. The distributed data base environment may be, for example, over the internet, intranet and/or other private networks. The distributed data base environment may also be, for example, over hard wired lines, modem connections, and the like.

As discussed previously, tension in the modern corporation, has two distinct aspects: on the one hand, it relentlessly pursues the goals of unlimited life, size, power, and license; on the other hand, it continues to evolve as a complex adaptive system (CAS) that is capable of evolving beyond its original, simple 'programming'. We have determined that the best hope for greater accountability lies in independent, informed, motivated and empowered shareholders.

We now explore this idea more fully via agent-based computer modelling—a relatively new technology that can reveal the interactions present within complex systems. We call this model the 'Brightline' model. Thinking about the corporation as a complex system operating within a complex system can quickly become intricate—so much so that it qualifies as an 'intrinsically difficult problem, one that requires for its full solution a 'computer as large as the universe running for at least as long as the age of the universe'.

Ultimately we focused our efforts very narrowly on the externalizing practices of large publicly held corporations, specifically those corporations where a substantial proportion of stock is held by institutional investors. The ability of these firms to access capital at attractive rates is directly dependent on their stock performance, which in turn is dependent on their ability to draw and maintain customers. We also decided to focus on the manner in which these corporations persistently externalize costs, one of the key concerns of the long-term owner, as described more fully below. We then built our model specifically around these mechanisms and the impact that active shareholders might have in responding. Of course, variations in the model are also possible, for example, for smaller coompanies, less stock dependent companies, companies that externalize costs in different manners, and the like.

We also designed the model to allow multiple runs using a wide range of variable settings, and optionally include the capability of then showing and comparing the results of multiple runs against one another. The result is a basic modelling program for exploring these fundamental issues of corporate accountability from a number of different perspectives. In particular we wanted to show, for example, how active shareholder involvement, by imposing new standards of accountability, might ultimately affect the long-term value of these large corporations. In creating our model we sought to reveal at least one of the mechanisms involved.

Further, by comparing runs, the present invention compares the results attained both with and without the presence of active shareholder involvement, what might be called the 'governance gap'. From an active shareholder's perspective, the ideal corporation should either be fully internalizing or fully disclosing indeed 'transparent'—in its accounting for the real costs of doing business. We believe that only the fully transparent corporation will maximize shareholder value over the long term, and that this is the central goal towards which all such reforms must be directed.

Where existing corporations externalize costs and even seek to influence the regulating mechanisms of government (i.e. taxation and penalties for illegal activities), the ideal corporation must accept full accountability for all of the costs of doing business—and active shareholders will seek to ensure this. Thus we chose to model corporate agents that seek to externalize costs in order to maximize short-term market gains and profitability. We also sought to show how the countering influence of active shareholders might impact this behavior in the interest of longer term and persistent value. Of course, other selections are possible, for example, companies that chose to only partially externalize costs, and/or companies with semi-active shareholders, and the like.

In the age of instant information, diminishing tariff barriers, free movement of currency, interchangeable domiciles for optimum production, and the universal availability (at least in theory) of management talent, much of the traditional 'competitive advantage' that one company enjoyed in competition with others has disappeared. Given these difficult competitive conditions, how can one company undersell another?

And so the values that government has traditionally given to business—patent protection, enforcement of 'property rights', and all manner of patents and franchises—now have an important new supplement. Business has become more competitive in the short term by externalizing its costs. The specific manifestations of this cost transfer vary from country to country. In one nation, we might see high unemployment, in another, high medical costs, and in yet another inadequate pension reserves. As the corporate cause of these social costs becomes more obvious, shareholders begin to see profits for the shell game they are, and adjust the value of stocks.

In sum, short-term competitiveness, purchased at a high social cost, cannot last. As we hope to show in the Brightline model, extreme externalization eventually causes a corporation to cease being competitive, a condition that can only be corrected by active shareholder involvement.

THE AGENTS

After carefully considering the minimum number of agents needed to effectively model our intended range of behaviors, we implemented the following interactive agents, altough additional/less agents may also be used:
  customers
  corporations
  government
  shareholders.

The Customer Agents

Figure 7:
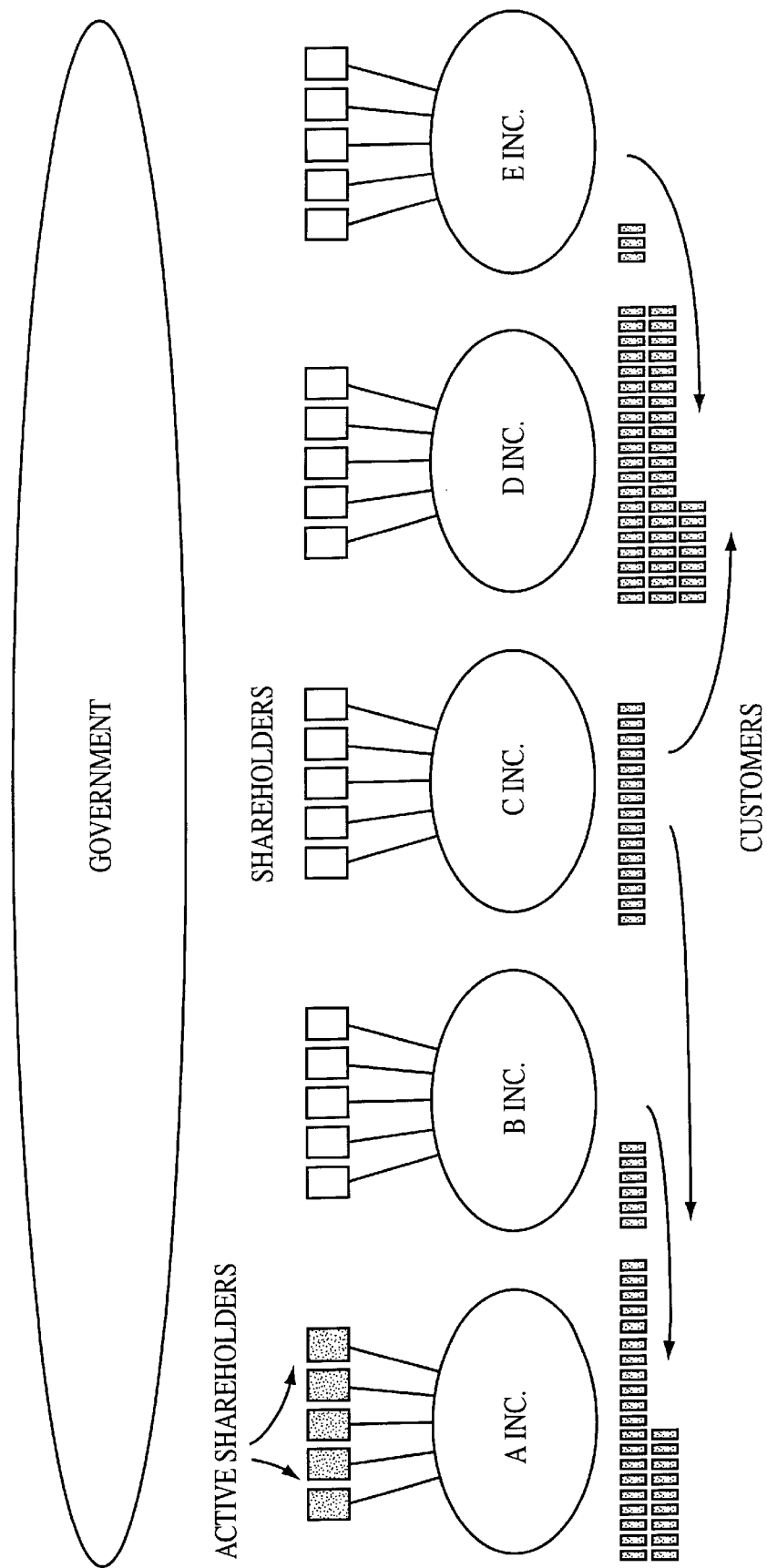
FIG. 7 is a conceptual illustration of the simulation model of the present invention.
Figure 8:
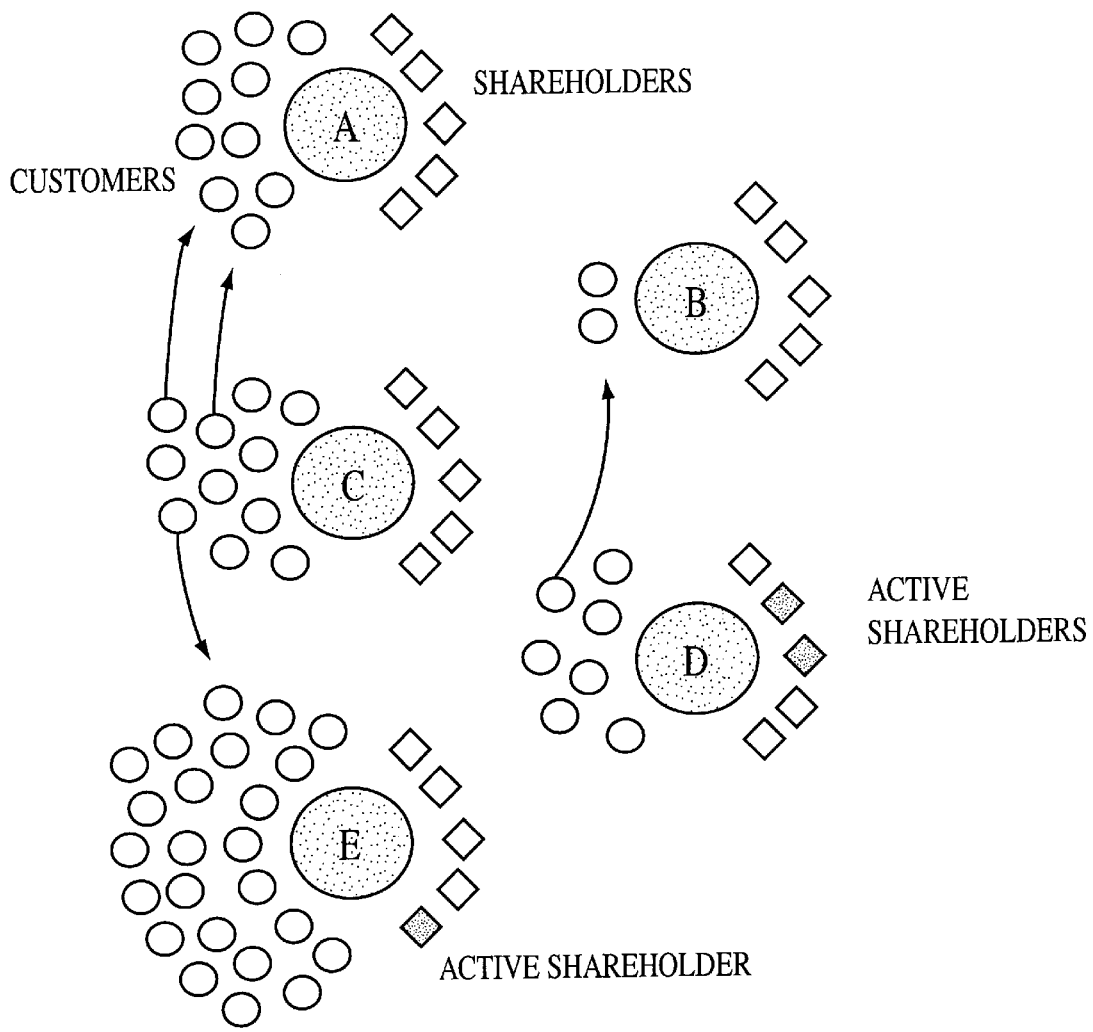
FIG. 8 is a conceptual illustration of the relationships between agents in the simulation model of the present invention.

The customer agents represent the purchasers of the products and services are assigned a variable number offered by the corporations. The corporations are assigned a variable number of customer agents at the beginning of each run, reflecting real-world variations in age and size. Customer agents may then choose to continue to 'buy' the goods or services of their original assigned corporation, or to jump ship to another as the run progresses. (See FIG. 7.) Relationships between agents is illustrated in FIG. 8.

The loss of customers translates directly into a decline in cash flow, a measure of short-term performance; this is the first of two standards we will use to 'value' each corporation. The second is the accumulated total number of customers held over time, a measure of the corporation's persistent value. We want to see what relative changes in valuation will occur between the beginning and end of the run, and to then gauge the impact of ACTIVE shareholder agents on these valuations.

While we acknowledge that real-world customers often can and do play an activist role in affecting corporate behavior, we felt that any effort attempting to model this role was optional, and not necessarily perferred. We note, however, that real-world customers and shareholders, particularly the beneficiaries of the institutional shareholders of these large publicly held corporations, are increasingly one and the same.

The Corporation Agents

The corporation agents begin each run having been assigned an equal share of the available customer agents, whose movements from corporation to corporation then provide the basic measure of each corporation agent's performance over the course of each business cycle. (See FIG. 9.)

To improve its performance, a corporation must attract new customers. It does this by 'posting' a more attractive 'price' for its 'products', but in this instance it may do so only by externalizing more of its 'costs'. The greater the degree of externalization, the lower the price; the lower the price, the more attractive the corporation becomes to potential customers. But while the customer agents react to such price changes on a per cycle basis, there are other effects of externalization that are cumulative and are monitored by both the government and shareholder agents. Thus, while a corporation may improve its performance in a given cycle by externalizing more of its costs, the long-term effects of such behavior will have a cumulative negative impact on performance. The corporation must always weigh the benefits of any short-term gains against this long-term cost to its value.

In a given business cycle each corporation agent must consider its current market share, existing price position, and the current impact of past externalizing practices in order to set a new price for attracting new customers. Ideally, this new price will be low enough to attract new customers without increasing the externalization of costs—because externalization lowers the long-term value of the company.

The Government Agent

The government agent responds to the effects of such externalization, either all at once or cumulatively over time, by imposing taxes and legal constraints upon the corporation agents. While one or more of the corporations may be responsible for such behaviors, it is important to note that as long as such behaviors fall within the law, the resultant governmental constraints generally apply equally to all the corporations.

Thus while 'taxes' effect all corporations and their shareholders more or less equally, governmental fines and legal settlements in response to extreme instances of externalization (described together for purposes of our model as 'fines') impact corporations individually. Furthermore, these penalties will then increase the likelihood that the shareholder agents attached to that corporation will become active. In this way our model reflects the long-term 'costs' to society of such externalizing behaviors, and the potential sensitivity of long-term shareholders to such mounting costs.

The Shareholder Agents

The shareholder agents have but a single variable attribute—they may become more or less ACTIVE in seeking to limit the externalizing practices of their corporations. As all of our shareholder agents represent long-term, value-directed investors, with concise and consistent needs for the future, they remain fully invested in a single corporation throughout the run of the model. (See FIG. 7.) We did not make any attempt to model the market behaviors of shareholders, although this is also within the scope of the present invention.

Instead, we programmed several typical shareholder tendencies into the model. Passive shareholders are 'satisfied' with their corporation's performance—and thus remain passive—whenever such performance improves or at least holds steady. They become 'unhappy', i.e. more likely to turn ACTIVE in response to decreases in performance.

In each run, however, the shareholders of one corporation are given the capacity to become ACTIVE, in response to excessive externalization by their corporations, particularly if such behavior reaches illegal levels, providing a much needed balancing mechanism. Eventually such ACTIVE shareholders, acting in concert—to become effective at least three of the five shareholders must become ACTIVE at the same time—then limit subsequent externalization by their corporation to insure that such practices will remain within the law, on the one hand limiting management's ability to seek the highest possible levels of short-term performance, but on the other effectively shielding the corporation from future intervention and fining by government.

The interests of shareholders and employees are sometimes identical. In fact, pension fund beneficiaries now in effect own as much as 26% of the outstanding stock in America's publicly held corporations, plus another 8% through other mechanisms such as employee stock ownership plans.

We chose to ignore the existence of the various other classes of shareholders, such as market speculators. These short-term holders, while having their place in the overall economy, are simply not generally of great influence, although the present invention may be modified to include same.

RUNNING THE MODEL

Thus the model includes a total of five corporation agents, and seeks to describe the impact of no more than five shareholder agents for each of the corporation agents. There is just one government agent, and there are 100 customer agents. These numbers reflect a not-uncommon number of competitors in a single market, a sufficient number of sizeable shareholders needed to directly impact such corporations, and a large enough pool of customers to clearly show market share trends and patterns. Other variations and/or numbers of agents may also be used.

At the beginning of each run a number of attribute variables are set by the run-time user. The typical run covers an elapsed time period of 300 cycles of activity. In the course of each cycle (see FIG. 9) the corporation agents post prices for their 'products' using greater or lesser degrees of externalization of costs. While more externalization may yield a more attractive lower price, it also increases the corporation's exposure to government taxation, negative public opinion, and eventually fines against performance—which will in turn increase the likelihood of shareholder activism. Following the posting of new prices, the customer agents then react by staying where they are or moving to a different corporation.

Next, the government agent examines the cumulative externalizing practices of all the corporation agents and reacts accordingly. Too much accumulated externalization will result in the application of more taxation, making further externalization more difficult and 'costly' for the corporation agents. And genuinely excessive externalization by an one corporation will result in the levying of penalties against that corporation, further inhibiting its ability to lower prices and compete more effectively.

Finally the shareholder agents react to this latest round of corporate 'performance', responding to changes in market share, the imposition of penalties against their corporation by the government, and the cumulative negative societal impact of over-externalization. Any excess of such factors will eventually cause certain shareholder agents to become ACTIVE, and thereafter seek to limit further externalization by their corporation.

Figure 9:
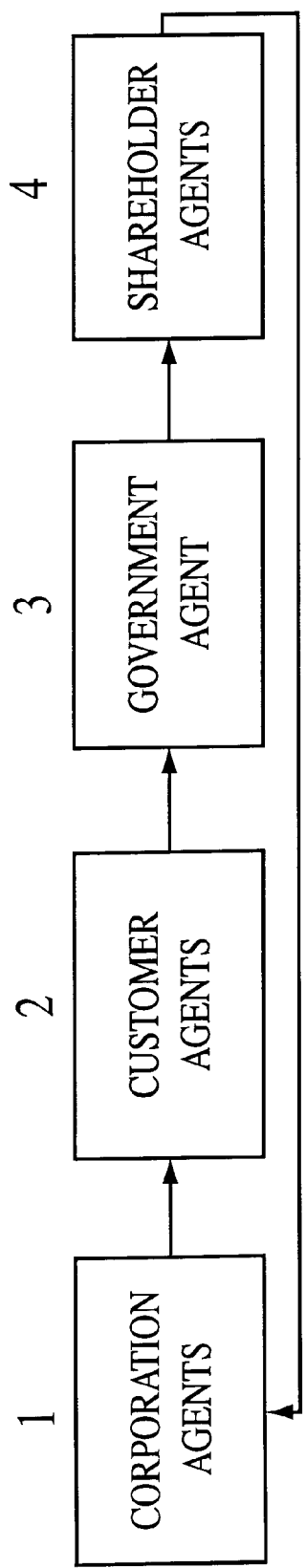
FIG. 9 is a conceptual illustration of the business cycle relationships between agents in the simulation model of the present invention.

More specifically, the following processes are performed, as illustrated in FIG. 9:

1. The Corporation Agents set price using greater or lesser degrees of externalization. Greater externalization yields a more attractive lower price—but increases the Corporation's exposure to Government intervention. While the potential for immediate gains in "earnings" (number of customers) in each cycle is increased by posting lower prices, the effects of externalizing costs have a cumulative effect.

2. The Customer Agents respond to the newly established prices of the Corporations by staying put or taking their business to a different Corporation. The resultant "earnings" curves thus reflect the short-term performance of each Corporation, based on it's market share at any given moment in time. The "total earnings" curves, however, reflect the accumulated total number of customers attracted and held by each Corporation over the full run of the model.

3. The Government Agent monitors the externalizing practices of all the Corporations, and will in time react by penalizing such behaviors. Once a total cumulative level has been reached, the greatest instances of externalization will be regarded as violations of the law, and will eventually result in penalties against each offending Corporation on an individual basis.

4. The Shareholder Agents react solely to corporate performance—the ability of the Corporations to increase earnings. Poor earnings will eventually cause the Shareholder agents of one of the poorly performing Corporations to become ACTIVE, i.e. to seek to limit the externalizing practices of their Corporation to within the legal limit.

This cycle then repeats, until the end of the run is reached. Throughout the run the user can monitor the various elements of agent interaction through graphic representation and pop-up information windows. Of course, the above sequence of events is not required to occur in the specific series described above, but may also occur in a different order and/or in parallel.

Figure 10:
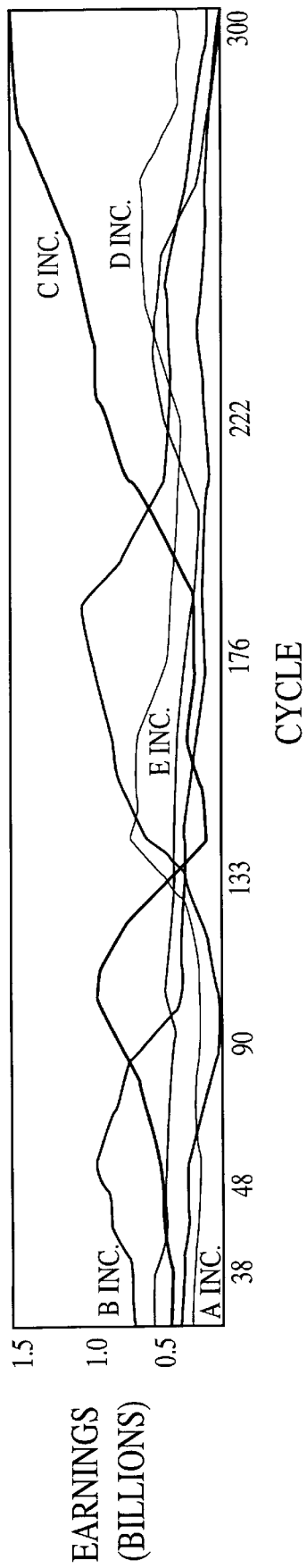
FIG. 10 is an illustration of an exemplary run of the simulation model of the present invention showing competition between five companies over a 300-cycle time span.

We present here (in FIG. 10) a run of the Brightline program to show competition between five companies over a 300-cycle time span. In this run, the companies compete for customers by reducing their liabilities through externalization. They externalize within the constraints of government intervention and fines, as well as shareholder intervention. What this particular run illustrates is that an aggressive management that is compelled by shareholders to function within government-determined limits will generate maximum values over the long term. This provides initial evidence that directors and other fiduciaries can use to require management restraint in various relationships with society. It is important to be able to project the long-term implications of particular patterns of corporate conduct. Corporate decisions can and should have a long-term beneficial impact—one that lasts after the retirement of most current officers and directors.

This sample run of the Brightline model illustrates both the advantages of corporate externalization in maximizing short-term performance and the longer-term advantages of a more controlled approach to externalization, motivated in the Brightline model by the presence of ACTIVE shareholders in one of our corporate agents. It is interesting to note, however, that the presence of ACTIVE shareholders alone cannot possibly have this effect, as our ACTIVE shareholder agents can only insist that the corporation act within the legal limits established by the government agent.

In the absence of government standards our model will either crash completely due to over-externalization, or result in complete monopoly by the most aggressively externalizing corporation. Similarly, in the absence of ACTIVE shareholders, the government agent alone will eventually prove ineffective, with the typical result being that the model will cycle endlessly between 'winning' corporations until eventually one gains monopolistic status.

One interesting twist on this variation, which need not be demonstrated using Brightline, is the kind of situation we now see in the tobacco industry, where government steps in ostensibly to address excessive externalization, but is utterly ineffective in doing so, merely resetting its own standards to a lower level, and in effect encouraging the previously existent unregulated cycling between competitors to continue.

In this particular run we can see clear examples of most of the interactions possible in Brightline. It is important to note, however, that this particular run is but one of a very great many possibilities. While we have presented this example as a somewhat 'typical' Brightline run, note that each and every run is different, given our beginning parameters, parameters, and it is only by comparing a great many such runs that the truly emergent patterns and possibilities presented by the model can be fully understood.

The run begins with all, for example, five corporations having, for example, an equal share of customer agents. Differnet numbers/variations may also be used. Although it is too soon in the run to tell, C Inc. has been chosen as the potential focus company, but its shareholders remain passive at this point as its performance is still quite high. E Inc. is the first corporation to begin externalizing aggressively, and assumes the earliest lead. By cycle 48, however, B Inc. has become even more aggressive, and has over-taken E and assumed the lead. Not only have all five corporations begun externalizing in an effort to attract customers, but all of them are now externalizing at 'illegal' levels. At the same time, the government agent has noted the rise in overall externalization and is preparing to begin fining the most aggressive companies.

Late in the run, company E is in the midst of value destruction caused by its externalizing practices. The market will not value E at levels comparable to the earnings, cash flow, and assets multiples accorded other companies. As soon as sustained and effective shareholder involvement emerges (which is eventually possible), positive valuation will resume.

For companies that have risky products (asbestos, silicone, or tobacco) or that generate environmental hazards (nuclear energy, oil), sudden public awareness has triggered retaliation and consequent loss of values. In some instances, the companies have failed to disclose what they knew about the impact of their functioning in society. In others, the companies have egregiously subverted the election and other political processes—sometimes in violation of the law.

Corporate contumacy predictably invites public retaliation in the form of fines, new restrictions, or even a trend toward socialization. The time frame in which this occurs in likely to be beyond the tenure of a single CEO, management team, or board of directors. Therefore, it is most likely to be addressed—if at all—by long-term owners.

By cycle 90, C Inc. has been able to assume the lead because both B and D have been fined by the government for their earlier high levels of externalization. C's shareholders remain passive, in light of C's performance, but C will now be next in line for government action.

The shareholders of our focus company, C Inc., do not in fact become ACTIVE until cycle 176, by which time C has already been fined and A has been able to take over the lead in current earnings. It is interesting to note that at this point all five corporations can claim roughly the same amount of accumulated earnings, our measure of long-term performance.

By cycle 222, however, the model has begun to stabilize, with C Inc.'s ACTIVE shareholders effectively limiting C's externalization to the legal limit. While all four of the other corporations now continue their cycles of over-externalization and consequent government action, C now has the advantage of complete freedom from government intervention, and its current earnings consistently surpass its competitors, even though total accumulated earnings continue to be fairly evenly balanced.

At the end of the run at cycle 300, moreover, not only has C retained its current cycle advantage, to dramatic effect, but can now claim the highest level of total earnings as well, by a factor of nearly 2:1. In this particular run, at least, the actions of ACTIVE shareholders have provided a clear competitive advantage.

Of course, not every run is so clear cut. In each run the interactions are different, with government intervention coming sometimes much earlier in the run, and sometimes much later, depending on the relative aggressiveness of the corporate agents. If the designated focus company is able to assume a large enough lead early on in the run its shareholders may become ACTIVE too late in the run have any real impact. Conversely, absent at least some degree of aggressive management in externalizing to gain greater customer share the focus company may never be able to gain enough advantage to 'win' by run's end. Over numerous multiple runs, however, some variation of this sample scenario emerges as the one most likely to occur, with the ACTIVE shareholder corporation turning in not only the best current performance but the best total performance as well.

Clearly then, at least in our Brightline model, it is a combination of factors that makes for the highest performance:

a corporation agent with an aggressive management style
  an effective government agent with clear standards for externalization
  ACTIVE shareholders able to hold their corporation to these standards.

In summary, we know that the real economic environment within which corporate entities operate is itself a complex, adaptive, self-organizing system. Thus, the overall trends and behaviors of the economy are aggregations of individually directed behaviors, exhibiting non-linear dynamic relationships. Real-world economic trends and behaviors are based on the interaction between individual corporations, boards, shareholders, customers, the government, and other shareholders. These trends and behaviors change over time as each individual entity seeks to gain a more advantageous position.

We have sought to model some of these interactions to explore the impact of responsible shareholder activism on the long-term performance of corporations. We have also sought to more fully explore the mechanisms whereby it is possible for one relatively small change in agent attributes within such a complex system—the shift of the shareholder role from passive owner to active Participant—to impact the overall patterns and trends of the larger system.

Our sample run illustrates how existing, typical corporations, lacking in active shareholder involvement, cannot effectively be regulated by government alone. The unreformed corporation seeks to maximize short-term profitability by externalizing as much of the true costs of doing business as possible, as we have seen both in our models and in the current case of the tobacco industry. But long-term shareholders, the actual owners of our public corporations, whose tenure over the generations will far exceed that of any given management/director term, can take action in the their own interest and in the interests of long-term value. We are not talking here about 'social investing', but rather best business practices—the maximization of long-term value.

Fiduciary shareholders and other participants in corporate life need structure and language with which to evaluate the relationship of current functioning and long-term value optimization. The Brightline model can help owners and boards understand and communicate the impact of externalizing behavior on corporate competitiveness. Preliminary results from model runs indicate that a high level and/or rate of externalization will bring—within a decade—substantial loss of competitive position. Owners, directors, and managers will want to consider these findings as they make decisions for the near and long term.

Corporate life has two distinct aspects. One aspect is the corporation's basic drive toward limitless life, size, power, and license; this is the corporation's basic programming, its systemic reality. But corporations are not only 'systems', they are complex adaptive systems open to renewal—and this is their saving grace.

The basic program of corporations as self-seeking entities wars against the interests of human beings. What is missing, in the corporate system today is accountability. By restoring accountability in each and every corporation, one corporation at a if need be, we can ensure that the corporations in our lives adapt not only to the environment in general, but to us humans as well. The key to change, is the importance of compliance, disclosure, and last, but not least, political restraint.

Figure 11:
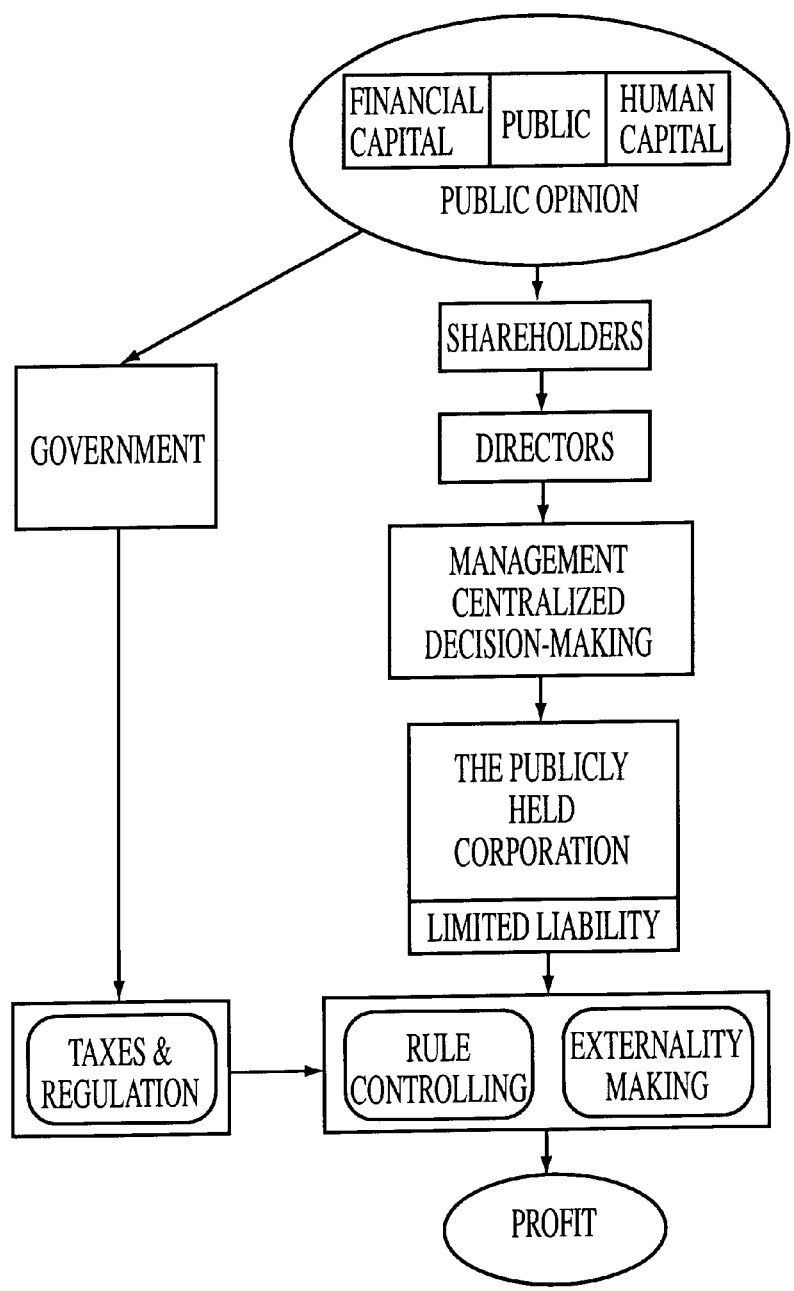
FIG. 11 is a conceptual illustration of existing corporations that wield great power over the public economy by externalizing costs and exerting undue influence over government rulemaking to maximize profit.
Figure 12:
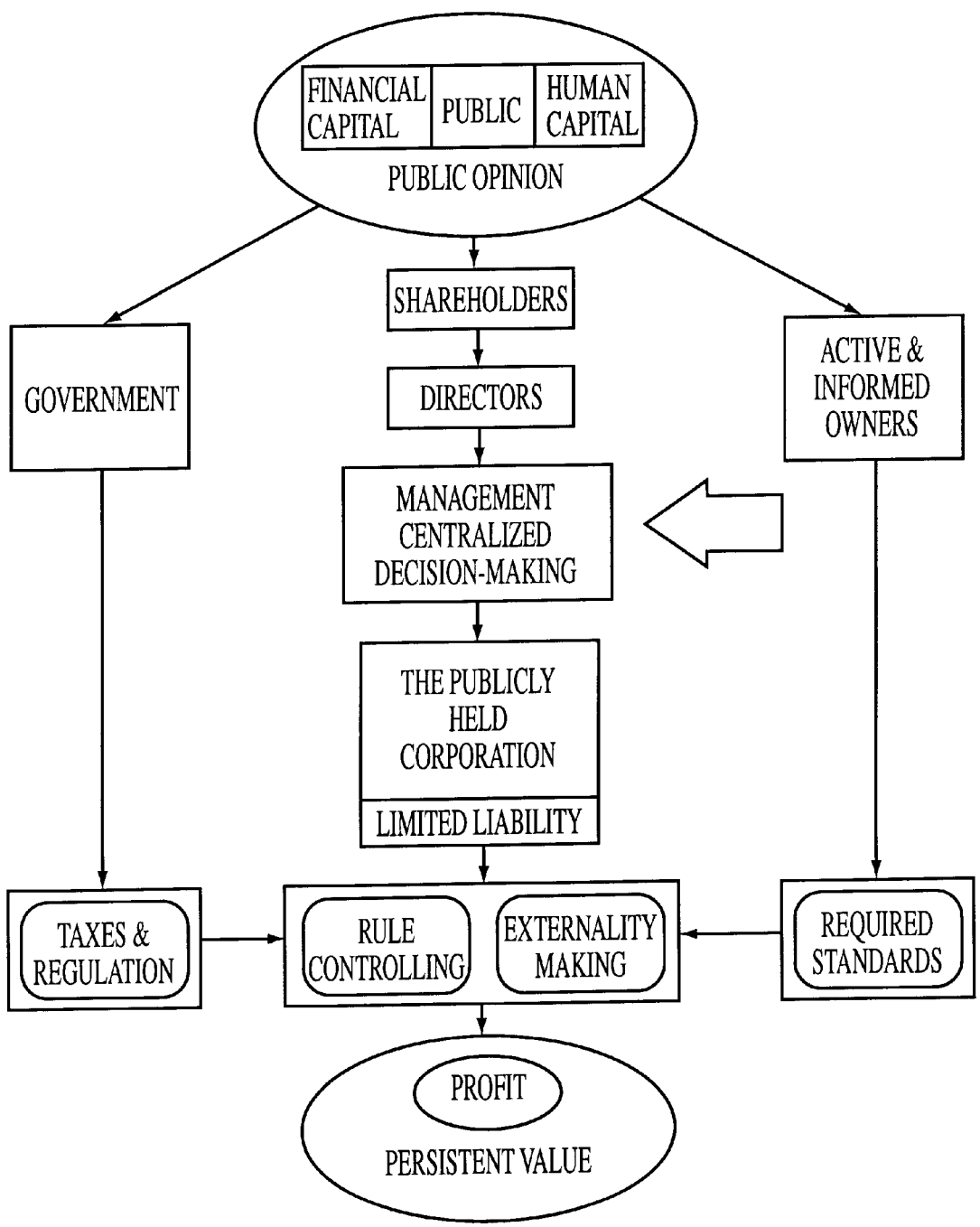
FIG. 12 is a conceptual illustration of the restored corporation, as a result of the simulation model of the present invention, where a new equation is written between persistent value and the interests of public through the mechanism of active and informed owners and through internalization of costs.

Compliance, disclosure, and political restraint. To help visualize the difference, consider these two diagrams: the Existing Corporation (FIG. 11), and the Restored Corporation (FIG. 12). As illustrated in FIG. 11, existing corporations wield great power over the public economy by externalizing costs and exerting undue influence over government rulemaking to maximize profit. As illustrated in FIG. 12, in the restored corporation, a new equation is written between persistent value and the interests of public through the mechanism of active and informed owners.

The model is intended for continual reuse in a number of settings. It was written in Java, and in such a way that the user could change all agent attribute variables at runtime. The model has also been successfully deployed on a web-based server, and thus made available via the Internet. Run-time users make a series of attribute variable settings and then run the model accordingly, with the results of each run presented graphically, showing the relative changes in the Corporation agents' performance.

The basic Brightline program is intended to be fully extensible at two levels. One, the model can be made to output the preset variables and the consequent results of multiple runs to a database for direct statistical analysis. Two, it can also be extended via aggregation, through the running of multiple simultaneous instances, each programmed to represent different individual elements of the overall governance of the Corporation agents, which can then be weighted and combined to yield an overall, more comprehensive view of the impact of active shareholder influence over each individual element.

In the latter case, a comprehensive set of Brightline instances, properly weighted and combined, would yield a potentially accurate and predictive model of the actual performance of a given economic sector, as impacted by effective corporate governance. Carried further, multiple instances of such comprehensive sets, again properly weighted and combined, could be expected to yield an intriguing model of an entire economy.

Thus the basic Brightline algorithm, thus extended, will form the basis for a comprehensive approach, using agent-based modeling and complexity theory, to model the impact of effective shareholder activism on an entire economic system.

SIMULATION MODEL USER INSTRUCTIONS

Brightline was written in Java and has been tested on various Wintel machines and Macs, as well as several Unix workstations. The source code is attached hereto in Appendix A. Though optimized for Netscape, the Brightline applets will also run just fine under Internet Explorer. The interface is not as clean, but the workings of the program are identical.

Click on the "Load Brightline Simulation" button to start the program. It may take several seconds to load. Once the main Brightline window comes up you can then Run, Pause, Step-cycle or Reset the simulation using the buttons at the bottom of the Screen. Before you begin to experiment with the various Custom settings available under the Parameters menu, FIG. 13, you might want to Run the program several times in its default state just to become familiar with how it works.

The behavior of each Brightline agent is controlled by the assignment of one or more attribute values, which in most cases can be changed within a preset range prior to the beginning of a run. In addition, the total number of business cycles in each run (the default setting is 300) and a fixed random number generator seed (which is used to determine all non-customizable settings) can be set at this time. These variables are set by the user in the Custom Parameters Settings window. (See FIG. 13). these attributes reflect the particular corporate personality which is running the corporation. As described below, the attributes we have selected for the simulation are indicative of the corporation, however, other attributes may also be used.

For example, while we have provided an overall set of values for shareholder participation, or reaction level, this attribute may also comprise several other attributes that indicate the overall reaction level magnitude. For example, percentage and/or magnitude of shareholders at meetings, percentage and/or magnitude of shareholder responses, percentage and/or magnitude of shareholders with significant voting authority, and the like, may all be combined to obtain the shareholder attributes of a particular corporation. Similar collection of attributes may be used to obtain government, coporation and/or customer agent attributes as well.

Thus, in the present invention, any individual or combination of attributes may be used to model corporate performance that are indicative, for example, of consequences of a corporation's externalization of costs and/or shareholder participation and/or government vigilience, and/or customer loyalty, and the like. Once the characteristics or operating policies of the corporation are converted to attributes, the simulation can be performed for a comparison or corporation performance to create an index or ranking of corporations.

The simulation may also be used to allow corporations/decision makers to be provided with indications of consequences of operating policies, specific decisions, and the like. The decision makers and/or corporation will be able to then make an informed decision, the entire process of which, may be open to shareholder and/or government and/or independent scrutiny. Examples of attributes are described below.

Attributes for the Government Agent

The minimum (the default is 1) and maximum (the default is 20) viligance level of the government Agent can be varied, as can the 'legal' level of present state externalization by any one Corporation Agent. The 'Brightline"-the level of cumulative externalization by all Corporations, can also be varied (the default setting is 30). The final variable for the Government Agent, which can be set either on or off, will determine whether the Government will be able to levy repetitive penalties against individual Corporations (the default setting is on).

Attributes for the Corporation Agents

The minimum (the default is 1) and maximum (the default is 10) activity level of the Corporation Agents can be varied, establishing the possible range of externalization activity to each. The presence of a single Focus Company, referred to in the Custom Parameter Settings window as 'Prizm,' can be made active or not, and the threshold cycle for possible activation (the default setting is cycle 50) and minimum number of upset shareholders needed to achieve critical 'active' mass (the default setting is 3) can also be set here.

Attributes for the Shareholder Agents

The minimum (the default is 1) and maximum (the default is 10) reaction to poor earnings performance can be set here.

Attributes for the Customer Agents

The relative minimum (the default is 19) and maximum (the default is 20) level of 'brand loyalty' can also be set here, which will determine mainly the overall rate of Customer Agent movement from Corporation to Corporation.

Figure 14:
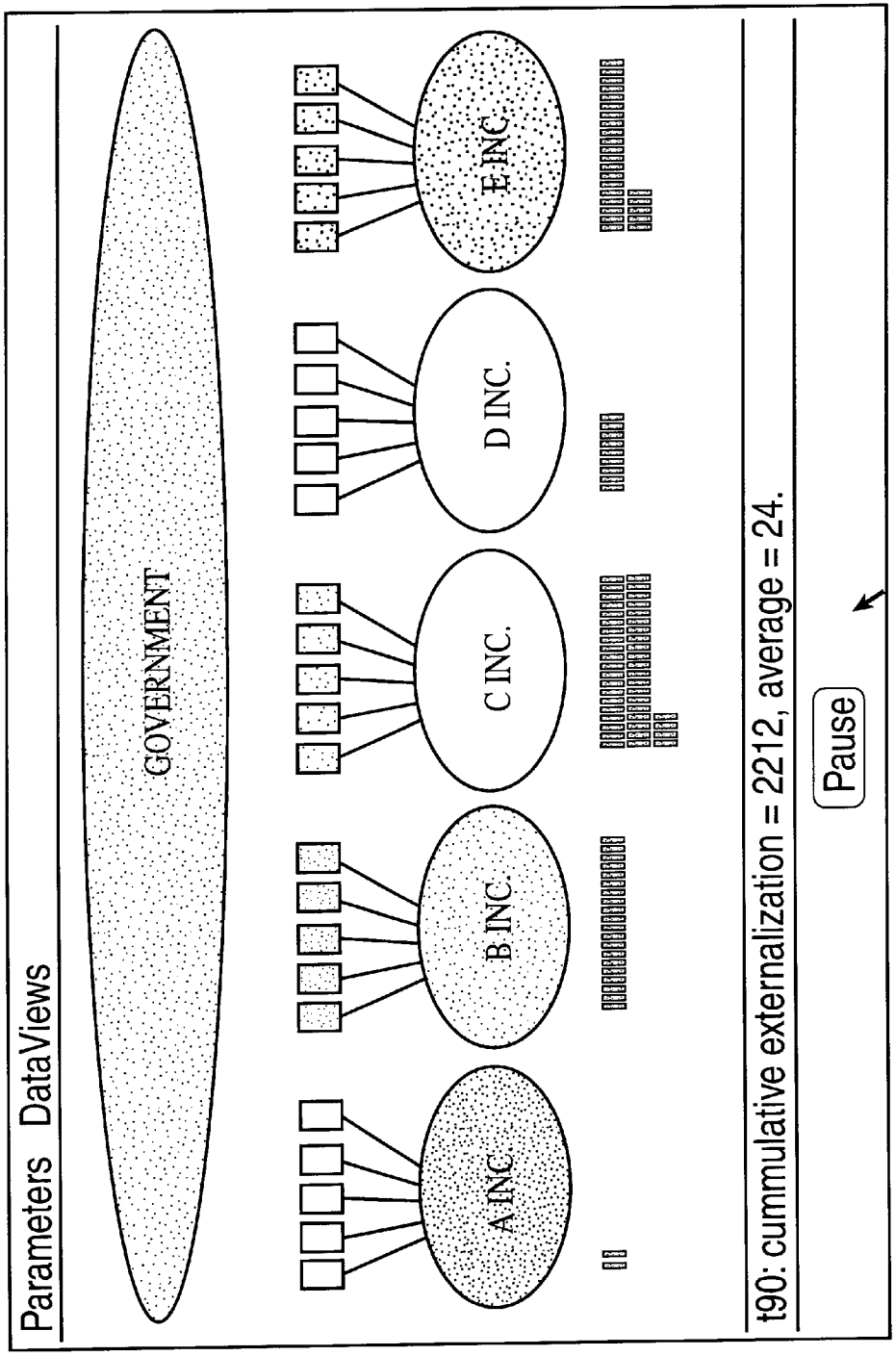
FIG. 14 is an illustration of the paprameter dataviews screen display showing the agent relationships and/or interactions as the simulation progresses.

As illustrated in FIG. 14, the five large ovals with corporate names are the Corporation agents. The five boxes above each oval represent the Shareholders of that Corporation, and the small black boxes represent Customers, with the Government agent represented by the large horizontal oval at the top. As the run progresses the five Corporation agents compete for Customers by lowering prices—which they can only do by increasingly externalizing costs.

This concept of externalized costs is the key behavioral element that Brightline is intended to demonstrate. The invention optionally discriminates between varying types and degrees of externalization, i.e. accounting fraud, environmental crime, negative customer health consequences, etc. Both the Shareholder agents and the Government agent monitor this process and react accordingly. Shareholders are looking to maximize their investment return, and therefore will be happiest when their Corporations performance is high. When the Shareholder agents are green this indicates contentment with their Corporation's performance; they will turn yellow if market share goes down. The Government watches both each Corporation's individual externalization level AND the cumulative total of externalization by all Corporations agents. It will become potentially active—and turn red—when the cumulative total reaches a certain level, reflecting an overall negative public response to industry practices as a whole. Once active the Government agent will then begin to penalize the most highly externalizing Corporation in a given cycle, which will momentarily turn red in indication.

A normal run of the program is 300 cycles, but larger or smaller cycles may also be used. Corporations who are penalized for over externalizing become less competitive as a result, accounting for the shifting cycles of Customer migration. During the run you can monitor the main performance indicators in a number of separate, real-time graphic display windows by using the DataViews menu, and screen size permitting, you can arrange nearly all of them to be visible at the same time, and pause them at any time to more closely examine the dynamics of a given cycle. You can also get more information about the relative states of each of the agents by simply pointing the mouse at them while paused.

The key action of the run occurs, in this simulation for example, when three or more of a given Corporation agent's Shareholders become "Active" indicated by those Shareholders turning red. In each run one of the Corporations is seeded with this potential—to become in effect a "focus company". These Active Shareholders then have the effect of preventing their Corporation from henceforth breaking the law—from exceeding the Government agent's legal limit for individual corporate externalization. In the default mode the action of the simulation is fairly predictable, although the seeding of the specific focus company and the actual timing of the various possible interactions among the Corporation agents is set at the beginning of the run on a random basis, so that each run will be a little bit different.

What makes the program more interesting—and truly "complex"—is that you can alter essentially ALL of the initial variables of a given run by using the Custom Parameter Settings screen (accessed under the Parameters menu). Here you can change the overall length of the run, lock in the random number generator to a specific seed, and set the behavioral ranges and limits of each of the agents.

Figure 15:
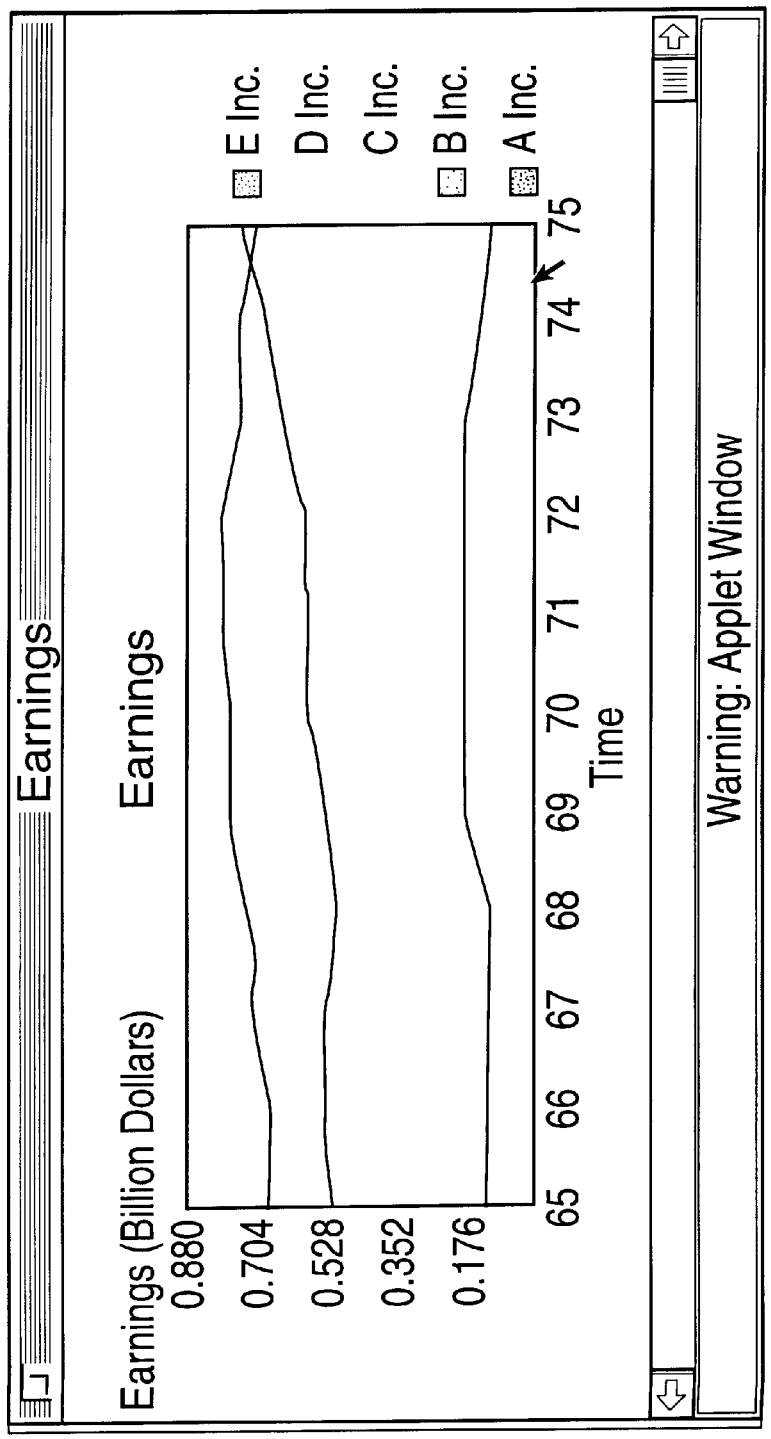
FIG. 15 is an illustration of an exemplary report displayed and/or printed as a result of the simulation.

The present invention also optionally includes a database/ spreadsheet backend to the program so that the output of a given run can be captured and stored, along with the initial settings. This facilitates comparing different runs with each other, the results obtained analytically in order to study the actual cycles and trends of the model in a much more sophisticated way. FIG. 15 is an illustration of an exemplary report displayed and/or printed as a result of the simulation.

The simulation model is intended for continual reuse in a number of settings. It was written in Java, and in such a way that the user could change all agent attribute variables at runtime. The model has also been successfully deployed on a web-based server, and thus made available via the Internet. Run-time users make a series of attribute variable settings and then run the model accordingly, with the results of each run presented graphically, showing the relative changes in the Corporation agents' performance.

The basic Brightline simulation model and/or program is intended to be fully extensible at two levels. One, the model can be made to output the preset variables and the consequent results of multiple runs to a database for direct statistical analysis. Two, it can also be extended via aggregation, through the running of multiple simultaneous instances, each programmed to represent different individual elements of the overall governance of the Corporation agents, which can then be weighted and combined to yield an overall, more comprehensive view of the impact of active shareholder influence over each individual element.

Figure 16:
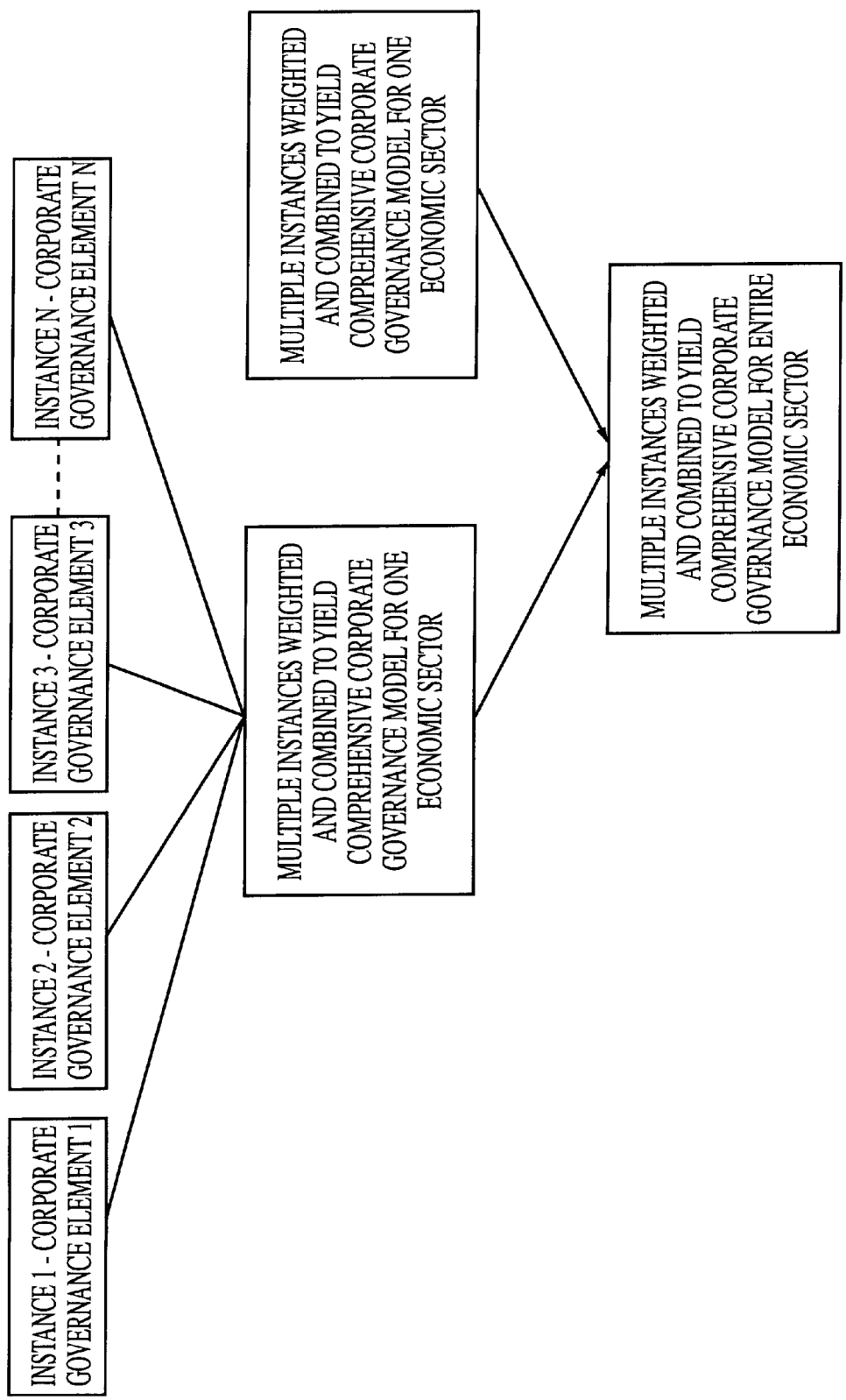
FIG. 16 is a conceptual illustration of another embodiment of the simulaiton model of the present invention.

In the latter case, a comprehensive set of Brightline instances, properly weighted and combined, would yield a potentially accurate and predictive model of the actual performance of a given economic sector, as impacted by effective corporate governance. Carried further, multiple instances of such comprehensive sets, again properly weighted and combined, could be expected to yield an intriguing model of an entire economy. See FIG. 16 for a conceptual illustration of this embodiment of the simulation model of the present invention.

Thus the basic Brightline algorithm, thus extended, will form the basis for a comprehensive approach, using agent-based modeling and complexity theory, to model the impact of effective shareholder activism on an entire economic system.

Figure 17:
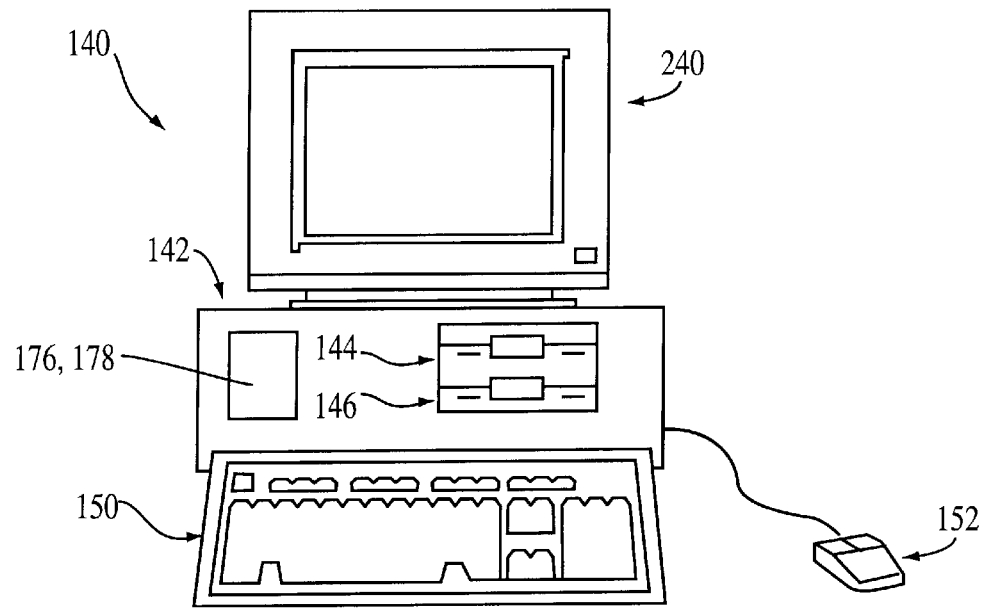
FIG. 17 is an illustration of a main central processing unit for implementing the computer processing in accordance with a computer implemented embodiment of the present invention.

FIG. 17 is an illustration of a main central processing unit for implementing the computer processing in accordance with a computer implemented embodiment of the present invention. The procedures described above may be presented in terms of program procedures executed on, for example, a computer or network of computers.

Viewed externally in FIG. 17, a computer system designated by reference numeral 140 has a central processing unit 142 having disk drives 144 and 146. Disk drive indications 144 and 146 are merely symbolic of a number of disk drives which might be accommodated by the computer system. Typically these would include a floppy disk drive such as 144, a hard disk drive (not shown externally) and a CD ROM indicated by slot 146. The number and type of drives varies, typically with different computer configurations. Disk drives 144 and 146 are in fact optional, and for space considerations, may easily be omitted from the computer system used in conjunction with the production process/ apparatus described herein.

The computer also has an optional display 148 upon which information is displayed. In some situations, a keyboard 150 and a mouse 152 may be provided as input devices to interface with the central processing unit 142. Then again, for enhanced portability, the keyboard 150 may be either a limited function keyboard or omitted in its entirety. In addition, mouse 152 may be a touch pad control device, or a track ball device, or even omitted in its entirety as well. In addition, the computer system also optionally includes at least one infrared transmitter 176 and/or infrared receiver 178 for either transmitting and/or receiving infrared signals, as described below.

Figure 18:
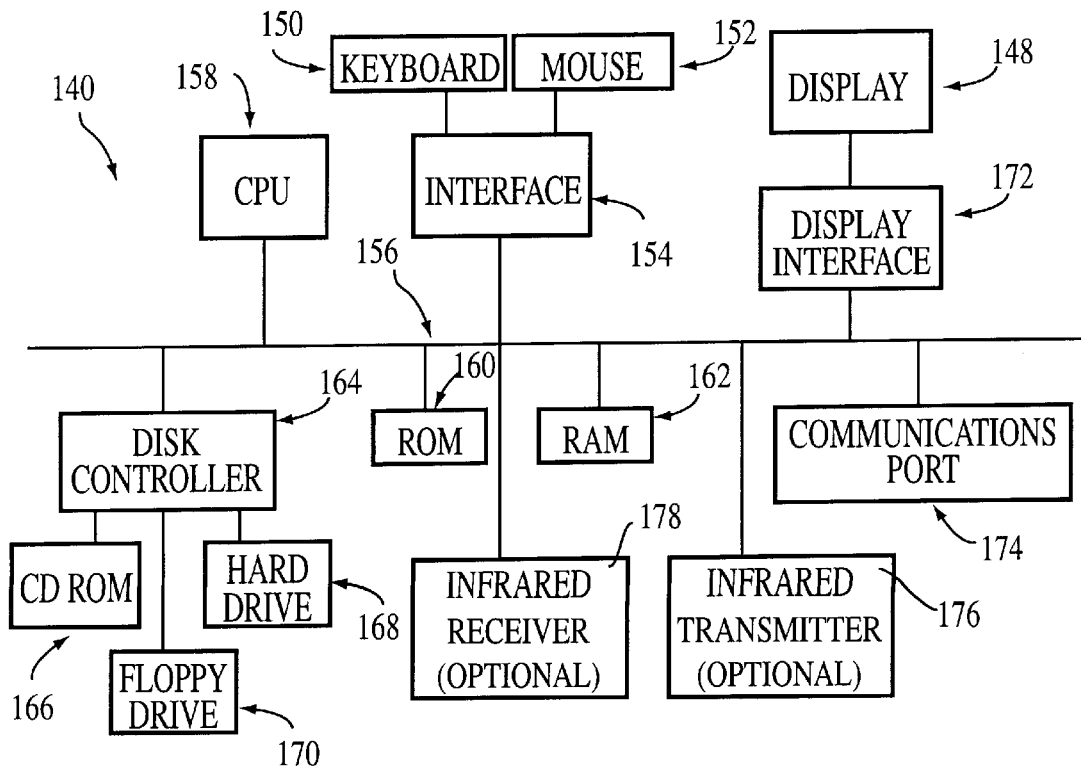
FIG. 18 illustrates a block diagram of the internal hardware of the computer of FIG. 17.

FIG. 18 illustrates a block diagram of the internal hardware of the computer of FIG. 17. A bus 156 serves as the main information highway interconnecting the other components of the computer. CPU 158 is the central processing unit of the system, performing calculations and logic operations required to execute a program. Read only memory (ROM) 160 and random access memory (RAM) 162 constitute the main memory of the computer. Disk controller 164 interfaces one or more disk drives to the system bus 156. These disk drives may be floppy disk drives such as 170, or CD ROM or DVD (digital video disks) drive such as 166, or internal or external hard drives 168. As indicated previously, these various disk drives and disk controllers are optional devices.

A display interface 172 interfaces display 148 and permits information from the bus 156 to be displayed on the display 148. Again as indicated, display 148 is also an optional accessory. For example, display 148 could be substituted or omitted. Communication with external devices, for example, the components of the apparatus described herein, occurs utilizing communication port 174. For example, optical fibers and/or electrical cables and/or conductors and/or optical communication (e.g., infrared, and the like) and/or wireless communication (e.g., radio frequency (RF), and the like) can be used as the transport medium between the external devices and communication port 174.

In addition to the standard components of the computer, the computer also optionally includes at least one of infrared transmitter 176 or infrared receiver 178. Infrared transmitter 176 is utilized when the computer system is used in conjunction with one or more of the processing components/stations that transmits/receives data via infrared signal transmission.

Figure 19:
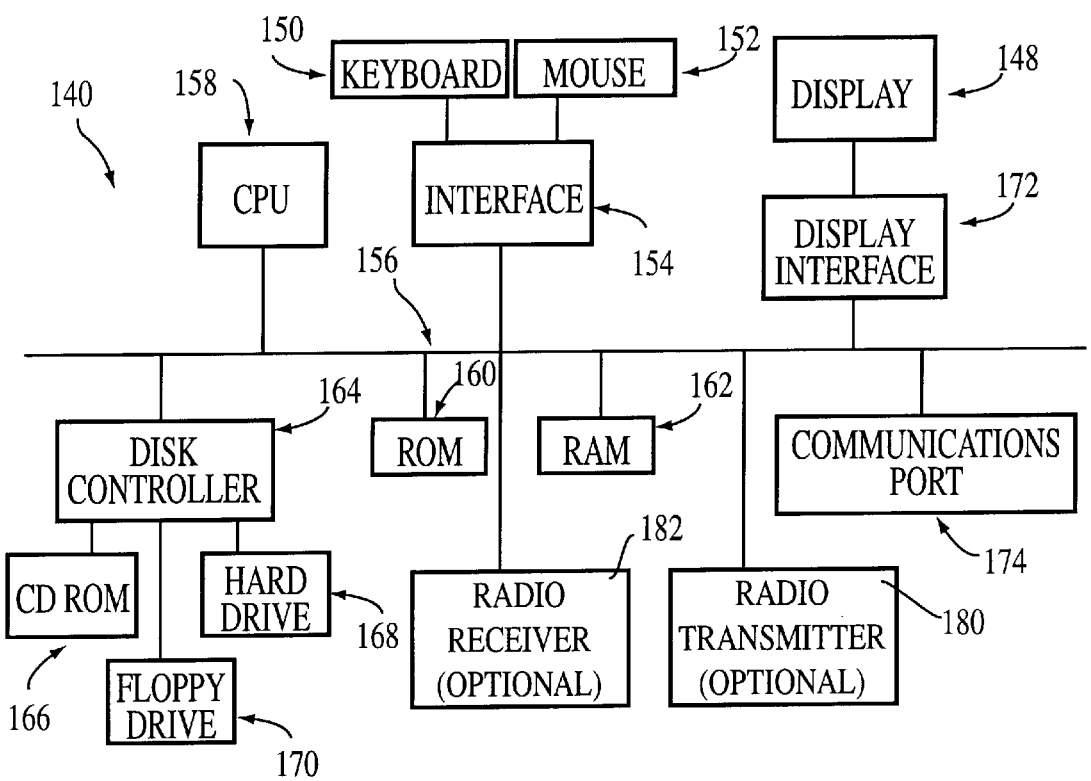
FIG. 19 is a block diagram of the internal hardware of the computer of FIG. 17 in accordance with a second embodiment.

FIG. 19 is a block diagram of the internal hardware of the computer of FIG. 17 in accordance with a second embodiment. In FIG. 19, instead of utilizing an infrared transmitter or infrared receiver, the computer system uses at least one of a low power radio transmitter 180 and/or a low power radio receiver 182. The low power radio transmitter 180 transmits the signal for reception by components of the production process, and receives signals from the components via the low power radio receiver 182. The low power radio transmitter and/or receiver 180, 182 are standard devices in industry.

Figure 20:
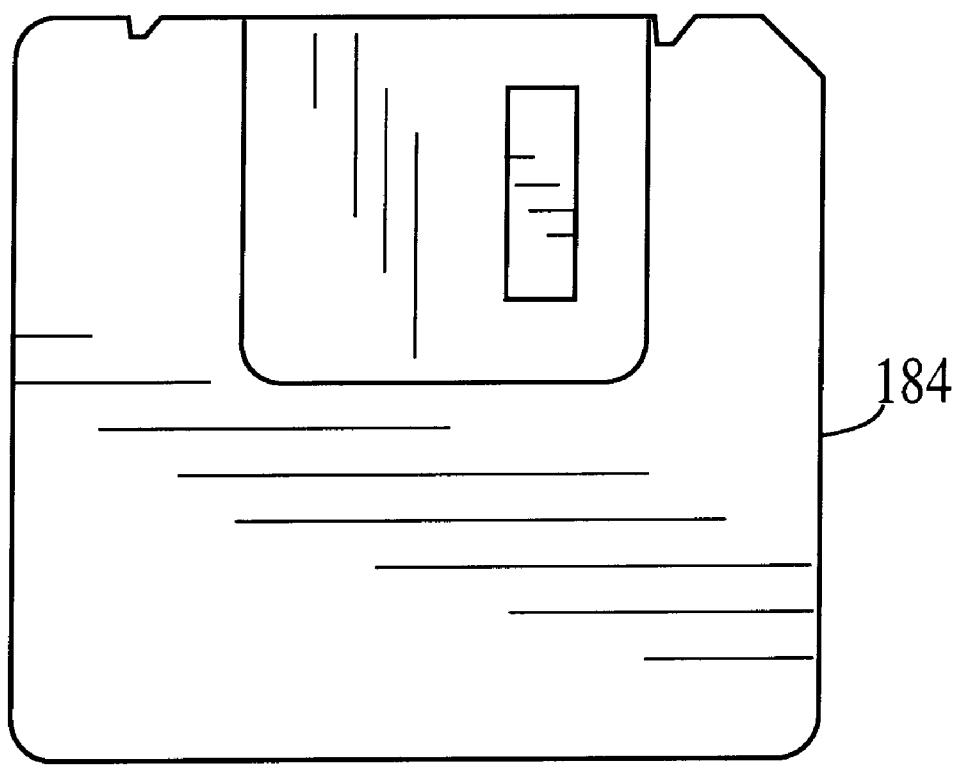
FIG. 20 is an illustration of an exemplary memory medium which can be used with disk drives illustrated in FIGS. 17–19.

FIG. 20 is an illustration of an exemplary memory medium which can be used with disk drives illustrated in FIGS. 17–19. Typically, memory media such as floppy disks, or a CD ROM, or a digital video disk will contain, for example, a multi-byte locale for a single byte language and the program information for controlling the computer to enable the computer to perform the functions described herein. Alternatively, ROM 160 and/or RAM 162 illustrated in FIGS. 18–19 can also be used to store the program information that is used to instruct the central processing unit 158 to perform the operations associated with the production process.

Although processing system 140 is illustrated having a single processor, a single hard disk drive and a single local memory, processing system 140 may suitably be equipped with any multitude or combination of processors or storage devices. Processing system 140 may, in point of fact, be replaced by, or combined with, any suitable processing system operative in accordance with the principles of the present invention, including sophisticated calculators,and hand-held, laptop/notebook, mini, mainframe and super computers, as well as processing system network combinations of the same.

Conventional processing system architecture is more fully discussed in *Computer Organization and Architecture*, by William Stallings, MacMillam Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference.

Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and in particular microprocessing circuit 158, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 21:
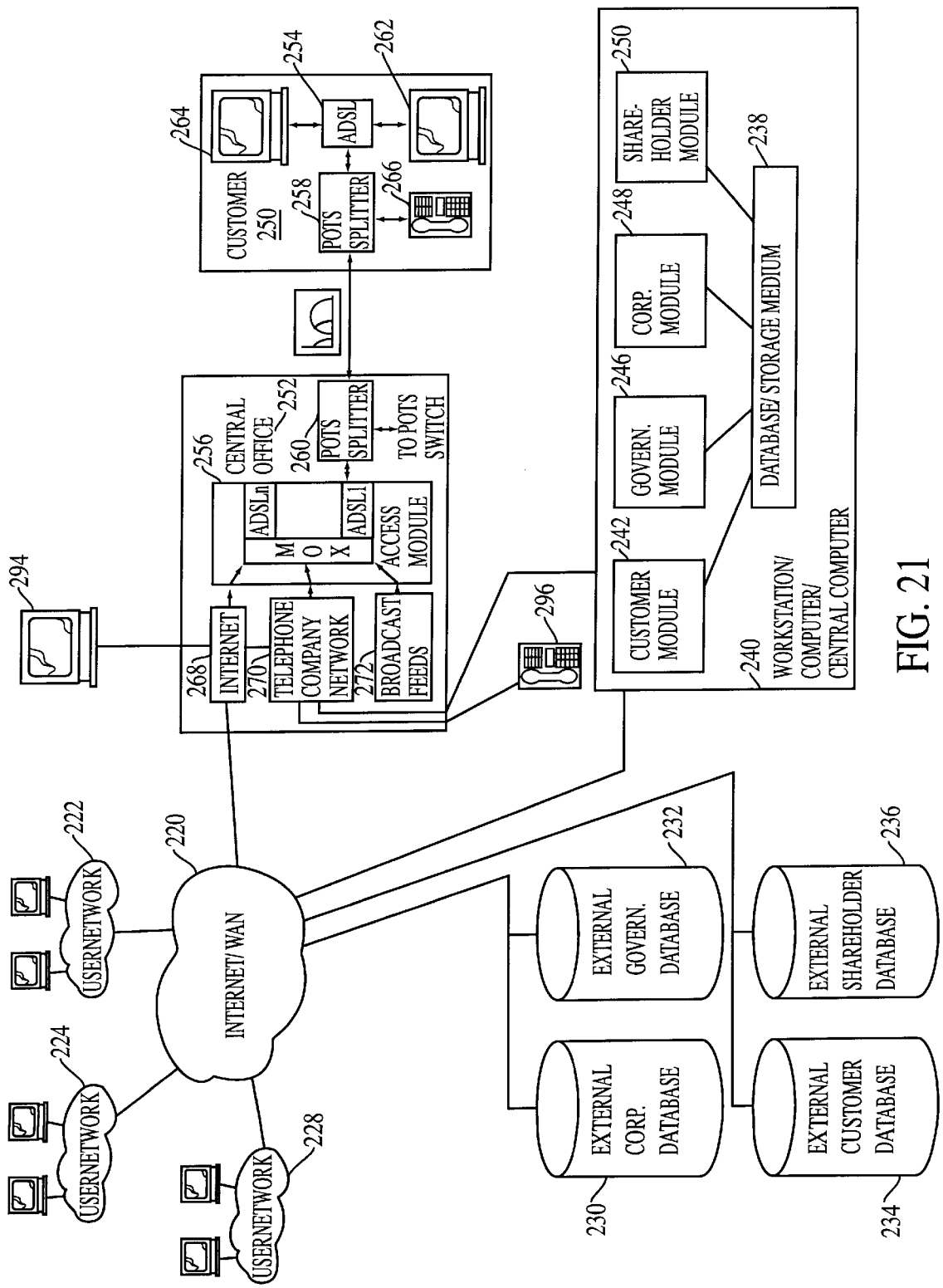
FIG. 21 is an illustration of the architecture of the combined internet, POTS, and ADSL architecture for use in the present invention in accordance with a first embodiment.

FIG. 21 is an illustration of the architecture of the combined internet, POTS, and ADSL architecture for use in the present invention in accordance with another embodiment. In FIG. 21, to preserve POTS and to prevent a fault in the ADSL equipment 254, 256 from compromising analog voice traffic 226, 296 the voice part of the spectrum (the lowest 4 kHz) is optionally separated from the rest by a passive filter, called a POTS splitter 258, 260. The rest of the available bandwidth—from about 10 kHz to 1 MHz—carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADSL makes use of advanced modulation techniques, of which the best known is the discrete multitone (DMT) technology. As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream out of one of the 6-MHz TV channels that occupy spectrum above 50 MHz (and more likely 550 MHz) and carve an upstream channel out of the 5–50-MHz band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The internet architecture 220 and ADSL architecture 254, 256 may also be combined with, for example, user networks 222, 224, and 228. As illustrated in this embodiment, users may access or use or participate in the administration, management computer assisted program in computer 240 via various different access methods. In this embodiment, the various databases 230, 232, 234, 236 and/or 238 are accessible via access to and/or by computer system 240, and/or via internet/local area network 220. These databases may optionally include objective criteria for evaluating the corporate governance characteristics for ranking the corporation.

For example, environmental data is generally publicly available which indicates a corporation's compliance history, outstanding violations or potential vilations, and the like, Similarly, standard legal and/or regulatory and/or administrative and/or business databases may be consulted to obtain additional information on corporate governance techniques, potential for government intervention, shareholder participation and/or customer loyalty. All this data may then be collected and analyzed to determine the overal attributes of the corporate, shareholder, government, and customer agents, for input into the simulation. Alternatively, the individual data may be used and input into the simulation, and the simulation may digest or process the data individually or collectively as part of the simulation.

In accordance with this embodiment, workstation 240 optionally includes modules 242, 246, 248, and 250 for individually handling the operations/simulation of the different agents. Alternatively, one module or a different number of modules may be used for processing the agent relationships, processes, and/or interactions.

Alternatively, users may access or use or participate in the simulation program for decision making, indexing, ranking, and the like, via various different access methods as well. The above embodiments are only to be construed as examples of the various different types of computer systems that may be utilized in connection with the computer assisted and/or implemented process for decision making, indexing, ranking, with respect to corporate governance.

Of course, another result of the simulation is identifying companies for investment purposes, and actually investing in these companies. Further, the actual investments may be done manually and/or electronically, and optionally over the internet.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer program product storing computer instructions therein for instructing a computer to perform a process of at least one of ranking and indexing enterprises with respect to at least one of each other and predetermined criteria to be used in at least one of investment decision making and enterprise decision making, the program product comprising:

a recording medium readable by the computer; and the computer instructions stored on said recording medium instructing the computer to perform the process, the instructions and the process including:

determining, via at least one of the computer and the user, at least one of enterprise attribute data, customer attribute data, shareholder attribute data and government attribute data;

storing, via the computer, the at least one enterprise attribute data, customer attribute data, shareholder attribute data and government attribute data on the recording medium;

implementing, via the computer, an enterprise computer simulation model that utilizes the at least one enterprise attribute data, customer attribute data, shareholder attribute data and government attribute data stored on the recording medium and generates enterprise performance data, the enterprise simulation model evaluating the enterprise performance data with respect to at least one of performance data of at least one other enterprise and predetermined criteria; and at least one of ranking and indexing, via at least one of the computer and the user, a plurality of enterprises using the enterprise performance data with respect to the at least one of each other and predetermined criteria.

2. A computer program product according to claim 1, wherein the enterprise computer simulation model implements an enterprise governance process that utilizes degree of shareholder involvement in determining whether the enterprise is effectively governable by government regulation.

3. A computer program product according to claim 2, wherein when the shareholder involvement is below a predetermined level, the enterprise governance process indicates that the enterprise maximizes short-term profitability by externalizing business costs.

4. A computer program product according to claim 1, wherein the enterprise attribute data includes an activity level, the customer attribute data includes brand loyalty, the shareholder attribute data includes reaction level, and the government attribute data includes vigilence level.

5. A computer program product according to claim 1, further comprising transmitting the at least one of ranking and indexing to at least one of the shareholders and enterprise managers for decision making.

6. A computer program product according to claim 1, further comprising transmitting the at least one of ranking and indexing to both shareholders and enterprise managers for decision making, and optionally customers and a government agent.

7. A computer program product according to claim 1, wherein the enterprise computer simulation model implements an enterprise governance process that utilizes varying types and degrees of externalization, including at least one of accounting fraud, environmental crime, negative customer health consequences, in evaluating the enterprise performance data with respect to the at least one of each other and predetermined criteria.

8. A computer program product according to claim 1, wherein the at least one enterprise attribute data, customer attribute data, shareholder attribute data and government attribute data, and values for same, are selectable by the user.

9. A computer program product according to claim 1, wherein the enterprise computer simulation model includes simulation variables, and the simulaiton variables include length of the run, and behavioral ranges and limits of the at least one enterprise attribute data, customer attribute data, shareholder attribute data and government attribute data.

10. A computer program product according to claim 1, wherein the enterprise computer simulation model dynamically monitors and displays the enterprise performance data in a plurality of graphic display windows.

11. A computer program product according to claim 1, wherein the enterprise computer simulation model activates simulation shareholder participation when market share is below a predetermined minimum, and activates simulation government intervention when externalization level and cummulative total of externalization is more than a predetermined maximum, and once active the simulation government intervention penalizes the simulation enterprise for at least one of the externalization and cummulative total of externalization.

12. A computer program product storing computer instructions therein for instructing a computer to perform a process to be used in at least one of investment decision making and enterprise decision making, the program product comprising:

a recording medium readable by the computer; and the computer instructions stored on said recording medium instructing the computer to perform the process, the instructions and the process including:

determining, via the at least one of the computer and the user, at least one of enterprise attribute data, customer attribute data, shareholder attribute data and government attribute data;

storing, via the computer, the at least one enterprise attribute data, customer attribute data, shareholder attribute data and government attribute data on the recording medium;

implementing, via computer, an enterprise computer simulation model that utilizes the at least one enterprise attribute data, customer attribute data, shareholder attribute data and government attribute data stored on the recording medium and generates enterprise performance data, the enterprise simulation model evaluating the enterprise performance data with respect to at least one of performance data of at least one other enterprise and predetermined criteria; and at least one of investing in, and controlling enterprise actions, via at least one of the computer and the user, responsive to the enterprise performance data.

13. A computer program product according to claim 12, wherein the enterprise computer simulation model implements an enterprise governance process that utilizes degree of shareholder involvement in determining whether the enterprise is effectively governable by government regulation.

14. A computer program product according to claim 13, wherein when the shareholder involvement is below a predetermined level, the enterprise governance process indicates that the enterprise maximizes short-term profitability by externalizing business costs.

15. A computer program product according to claim 12, wherein the enterprise attribute data includes an activity level, the customer attribute data includes brand loyalty, the shareholder attribute data includes reaction level, and the government attribute data includes vigilence level.

16. A computer program product according to claim 12, further comprising transmitting at least one of a ranking and indexing to at least one of shareholders and enterprise managers for decision making.

17. A computer program product according to claim 12, further comprising transmitting at least one of a ranking and indexing to both shareholders and enterprise managers for decision making, and optionally customers and a government agent.

18. A computer program product according to claim 12, wherein the enterprise computer simulation model implements an enterprise governance process that utilizes varying types and degrees of externalization, including at least one of accounting fraud, environmental crime, negative customer health consequences, in evaluating the enterprise performance data with respect to the at least one of each other and predetermined criteria.

19. A computer program product according to claim 12, wherein the at least one enterprise attribute data, customer attribute data, shareholder attribute data and government attribute data, and values for same, are selectable by the user.

20. A computer program product according to claim 12, wherein the enterprise computer simulation model includes simulation variables, and the simulaiton variables include length of the run, and behavioral ranges and limits of the at least one enterprise attribute data, customer attribute data, shareholder attribute data and government attribute data.

21. A computer program according to claim 12, wherein the enterprise computer simulation model dynamically monitors and displays the enterprise performance data in a plurality of graphic display windows.

22. A computer program product according to claim 12, wherein the enterprise computer simulation model activates simulation shareholder participation when market share is below a predetermined minimum, and activates simulation government intervention when externalization level and cummulative total of externalization is more than a predetermined maximum, and once active the simulation government intervention penalizes the simulation enterprise for at least one of the externalization and cummulative total of externalization.

23. A computer implemented process including computer instructions stored on a computer program product instructing a computer to perform a process of at least one of ranking and indexing enterprises with respect to at least one of each other and predetermined criteria to be used in at least one of investment decision making and enterprise decision making, the program product including a recording medium readable by the computer, and the computer instructions stored on said recording medium instructing the computer to perform the computer implemented process, comprising the steps of:

(a) determining, via at least one of the computer and the user, at least one of enterprise attribute data, customer attribute data, shareholder attribute data and government attribute data;

(b) storing, via the computer, the at least one enterprise attribute data, customer attribute data, shareholder attribute and government attribute data on the recording medium;

(c) implementing, via the computer, an enterprise computer simulation model that utilizes the at least one enterprise attribute data, customer attribute data, shareholder attribute data and government attribute data stored on the recording medium and generates enterprise performance data, the enterprise simulation model evaluating the enterprise performance data with respect to at least one of performance data of at least one other enterprise and predetermined criteria; and (d) at least one of:

at least one of investing in, and controlling enterprise actions, via at least one of the computer and the user, responsive to the enterprise performance data, and at least one of ranking and indexing, via at least one of the computer and the user, a plurality of enterprises using the enterprise performance data with respect to the at least one of each other and predetermined criteria.

24. A computer system including a program product storing computer instructions therein for instructing the computer system to perform the process of at least one of ranking and indexing enterprises with respect to at least one of each other and predetermined criteria to be used in at least one of investment decision making and enterprise decision making, the program product including a recording medium readable by the computer, and the computer instructions stored on said recording medium instructing the computer to perform the computer implemented process, comprising:

first means for determining, via at least one of the computer and the user, at least one enterprise attribute data, customer attribute data, shareholder attribute data and government attribute data;

second means for storing, via the computer, the at least one enterprise attribute data, customer attribute data, shareholder attribute data and government attribute data on the recording medium;

third means for implementing, via the computer, an enterprise computer simulation model that utilizes the at least one enterprise attribute data, customer attribute data, shareholder attribute data and government attribute data stored on the recording medium and generates enterprise performance data, the enterprise simulation model evaluating the enterprise performance data with respect to the at least one of each other and predetermined criteria; and fourth means for at least one of:
 fifth means for at least one of investing in, and controlling enterprise actions, via at least one of the computer and the user, responsive to the enterprise performance data, and
 sixth means for at least one of ranking and indexing, via at least one of the computer and the user, a plurality of enterprises using the enterprise performance data with respect to the at least one of each other and predetermined criteria.

\* \* \* \* \*